United States Patent
Sato et al.

(10) Patent No.: US 7,047,538 B2
(45) Date of Patent: May 16, 2006

(54) RECORDING AND/OR REPRODUCING DEVICE FOR DISK

(75) Inventors: Masahiro Sato, Iwate (JP); Ikuo Nitta, Miyagi (JP); Yuji Takahashi, Miyagi (JP)

(73) Assignee: Sony Corporation, Tokyo (JP)

(*) Notice: Subject to any disclaimer, the term of this patent is extended or adjusted under 35 U.S.C. 154(b) by 280 days.

(21) Appl. No.: 10/148,874

(22) PCT Filed: Nov. 7, 2001

(86) PCT No.: PCT/JP01/09717

§ 371 (c)(1),
(2), (4) Date: Jun. 11, 2002

(87) PCT Pub. No.: WO02/41314

PCT Pub. Date: May 23, 2002

(65) Prior Publication Data
US 2002/0191500 A1 Dec. 19, 2002

(30) Foreign Application Priority Data
Nov. 17, 2000 (JP) .............................. 2000-350523

(51) Int. Cl.
G11B 17/35 (2006.01)
(52) U.S. Cl. ....................................................... 720/619
(58) Field of Classification Search ............... 369/77.1, 369/77.2, 272, 77.21, 77.11, 75.11, 75.12, 369/291; 360/98.04, 98.06; 720/619, 620, 720/621, 622
See application file for complete search history.

(56) References Cited

U.S. PATENT DOCUMENTS 5,831,957 A * 11/1998 Matsushima ............... 369/77.2

FOREIGN PATENT DOCUMENTS

| JP | 23958/1985 | 2/1985 |
| JP | 6851/1992 | 1/1992 |
| JP | 07235114 A * | 9/1995 |
| JP | 7-282519 | 10/1995 |
| JP | 09128864 A * | 5/1997 |
| JP | 09259503 A * | 10/1997 |

* cited by examiner

Primary Examiner—William Korzuch
Assistant Examiner—Mark Blouin
(74) Attorney, Agent, or Firm—Oblon, Spivak, McClelland, Maier & Neustadt, P.C.

(57) ABSTRACT

A disk auto-changer comprises a disk cartridge comprising a plurality of trays for supporting disks, an elevator arranged in the disk cartridge on one side thereof, and a loading mechanism for drawing the trays into the elevator from the disk cartridge and for returning them from the elevator to the disk cartridge.

The loading mechanism comprises a tray engaging portion engaged with the hook portion of the tray, a belt for moving the tray engaging portion in the tray access direction, and a belt drive mechanism for driving the belt.

The above structure allows an improvement in efficiency of an installation space of the loading mechanism of the disk auto-changer.

5 Claims, 26 Drawing Sheets

RECORDING AND/OR REPRODUCING DEVICE FOR DISK

This application is a 371 of PCT JP01/09717 Nov. 7, 2001.

TECHINICAL FIELD

This invention relates to a disk recording and/or reproducing apparatus such as disk auto-changer, and particularly, to an improved loading mechanism.

BACKGROUND ART

There is known a disk auto-changer as shown in FIG. 32. The disk auto-changer 201 comprises a disk cartridge 204 hierarchically containing a plurality of trays 203 with disk recording mediums (refer hereinafter to as disks) disposed thereon, an elevator or elevating unit 205 arranged opposite to an opening of the disk cartridge 204, a movement control mechanism 206 for moving up and down the elevator 205 to the position of a desired tray 203 contained in the disk cartridge 204, and a loading mechanism 207 for drawing the tray 203 from the disk cartridge 204 into the elevator 205 or return it from the elevator 205 to the disk cartridge 204. The loading mechanism 207 is provided on the top face of the elevator 205.

As shown in FIG. 33, the loading mechanism 207 comprises a tray engaging portion 208 engaged with a hook portion 203a provided on the tray 203, a rotary arm 209 for moving the tray engaging portion 208 in the tray drawing direction or tray pushing back direction (refer hereinafter to as tray loading/unloading direction), and an arm rotating mechanism 210 for rotating the rotary arm 209.

The tray engaging portion 208 moves along a guide slot 212 with a pin 211 provided on the top face thereof inserted in the guide slot 212 provided on the top face of the elevator 205.

The rotary arm 209 is rotatably mounted on the top face of the elevator 205 by a shaft 213. The rotary arm 209 has one end provided with a slot-like shaft operation hole 214 having the pin 211 on the top face of the tray engaging portion 208 inserted therein, and another end provided with an arc-like rack 215 with the shaft 213 as center.

The arm rotating mechanism 210 comprises a pinion 216 meshed with the arc-like rack 215 and a motor 218 for rotating the pinion 216 through a gear train 217.

When rotating the pinion 216 counterclockwise by the motor 218, the rotary arm 209 rotates clockwise about the shaft 213 to move the tray engaging portion 208 in the tray drawing direction. When reversely rotating the motor 218 to rotate the pinion 216 clockwise, the rotary arm 209 rotates counterclockwise about the shaft 213 to move the tray engaging portion 208 in the tray pushing out direction. θ indicates the range of rotation of the rotary arm 209.

Then, due to its structure that the tray engaging portion 208 is moved by the rotary arm 209 as described above, the loading mechanism 207 of the above conventional disk auto-changer 201 raised the following problems:

(1) The existence of the range of rotation θ of the rotary arm 209 increases its occupation space, leading to deterioration of the efficiency of an installation space of the loading mechanism 207.

(2) With change in angle of rotation of the rotary arm 209, a force working on the tray engaging portion 208 changes, resulting in difficult movement of the tray engaging portion 208 by a uniform force.

The present invention is made to solve the above conventional problems, and allows an improvement in efficiency of the installation space and movement of the tray engaging portion by a substantially uniform force over the overall range of movement of the tray engaging portion.

DISCLOSURE OF THE INVENTION

The invention in claim 1 proposes a disk recording and/or reproducing apparatus, wherein in that it comprises a disk cartridge comprising a plurality of trays for holding disks; a disk recording and/or reproducing portion disposed opposite to an opening of the disk cartridge; and a loading mechanism for carrying the trays out of the disk cartridge to the disk recording and/or reproducing portion and for carrying the trays from the disk recording and/or reproducing portion into the disk cartridge, wherein the loading mechanism comprises a tray engaging portion engaged with an engaged portion of the tray, a belt for moving the tray engaging portion, and a belt drive mechanism for driving the belt, and wherein the tray engaging portion is moved by the belt, so that the efficiency of an installation space of the loading mechanism can be improved as compared with a conventional case using a rotary arm to move the tray engaging portion.

The invention in claim 2 proposes the disk recording and/or reproducing apparatus as specified in claim 1, wherein an endless belt is used as the belt, so that rotating the endless belt allows movement of the tray engaging portion.

The invention in claim 3 proposes the disk recording and/or reproducing apparatus as specified in claim 2, wherein the tray engaging portion is mounted to a linear motion portion of the endless belt, so that a uniform operating force can be given to the tray engaging portion in the overall range of the direction of movement thereof.

The invention in claim 4 proposes the disk recording and/or reproducing apparatus as specified in claim 3, wherein the belt drive mechanism uses a sprocket, wherein the sprocket comes in contact with a linear portion of the endless belt between the pulleys to move the endless belt, wherein at least the linear portion of the endless belt with which the sprocket comes in contact includes a hole engaged with a protrusion arranged on a circumferential surface of the sprocket, allowing sure achievement of movement of the endless belt.

The invention in claim 5 proposes a loading mechanism, characterized in that a belt serves to drive a tray engaging portion engaged with a tray engaged portion of a disk cartridge to perform carrying-out and carrying-in of the tray, wherein movement of the tray engaging portion is carried out by the belt, so that it has the advantage in terms of an installation space as compared with a conventional one wherein the tray engaging portion is the rotary arm, facilitating its mounting to the recording and/or reproducing apparatus and the like, resulting in possible achievement of a reduction in size of the overall apparatus.

BEST MODE FOR CARRYING OUT THE INVENTION

Next, taking the disk changer as an example, the disk recording and/or reproducing apparatus of the present invention is described in the sequence of (1) general description of disk changer, (2) description of disk cartridge, (3) description of elevating unit (elevator), (4) description of up-and-down movement control mechanism, (5) description of loading mechanism, (6) description of disk chucking mechanism, (7) description of operation of disk changer in its entirety and, (8) description of another embodiment of up-and-down movement control mechanism.

(1) General Description of Disk Changer

Figure 1:
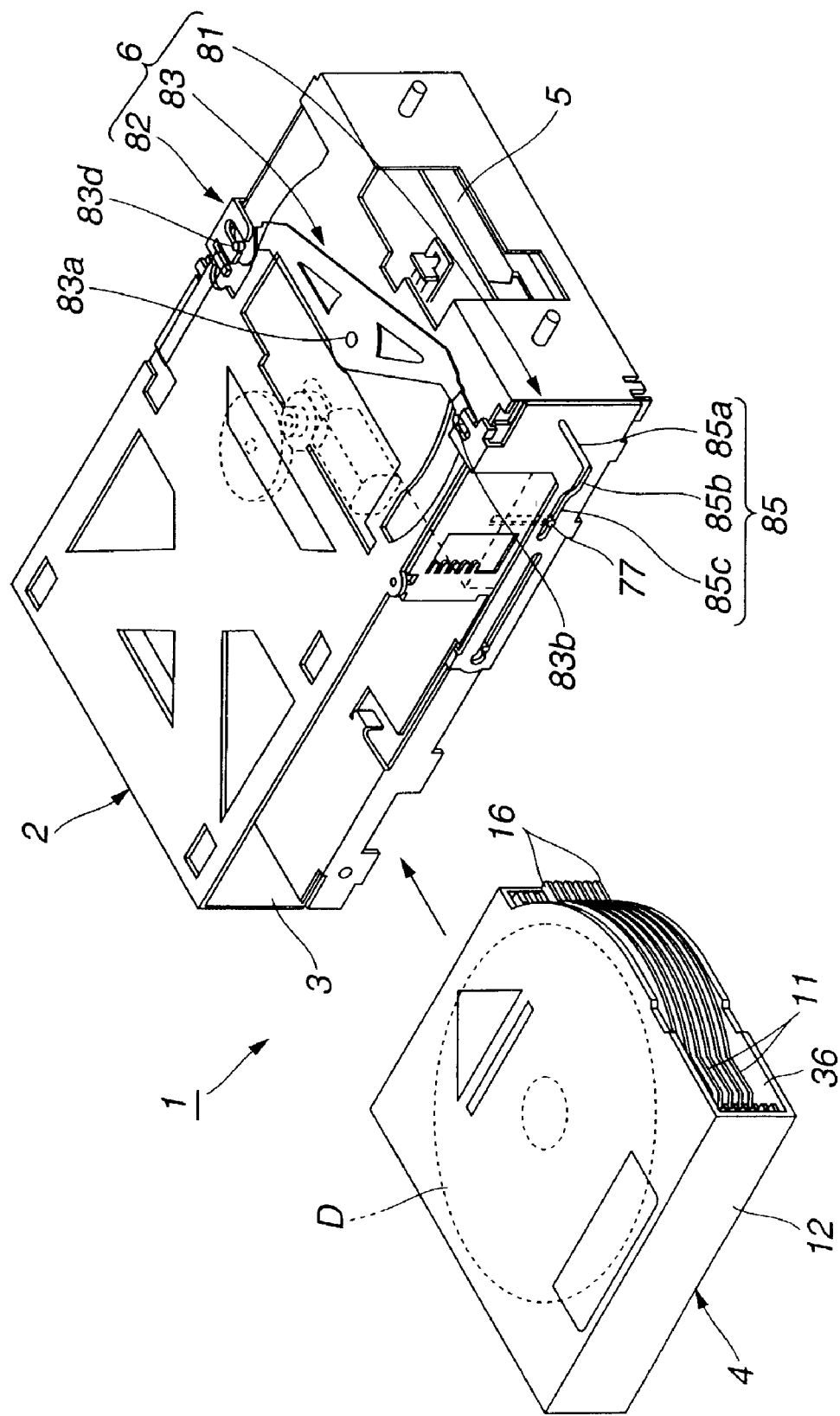
FIG. 1 is a perspective view of the disk auto-changer.

FIG. 1 is a perspective view of the disk changer 1. A disk changer 1 comprises a disk cartridge 4 comprising trays 11, . . . 11 for disposing thereon a plurality of disks to be loaded in a cartridge housing 3 of a mechanical chassis 2, an elevating unit (refer hereinafter to as elevator) 5 arranged in the cartridge housing 3 on one side thereof, an up-and-down movement control mechanism 6 for moving up and down the elevator 5 along an opening 36 of the disk cartridge 4 loaded in the cartridge housing 3, a loading mechanism 7 (see FIG. 23) for receiving and delivering a tray between the disk cartridge 4 and the elevator 5, and a disk chucking mechanism 8 (see FIG. 14) for chucking onto a disk table a disk on the tray carried to the elevator 5 by the loading mechanism 7. The elevator 5 is moved up and down to the position of a desired tray 11 of the disk cartridge 4 by the up-and-down movement control mechanism 6 so as to carry the desired tray 11 to the elevator 5 through the loading mechanism 7. Then, a disk D disposed on the tray 11 is chucked onto the disk table by the disk chucking mechanism 8, performing recording and/or reproducing of the disk.

(2) Description of Disk Cartridge

Figure 2:
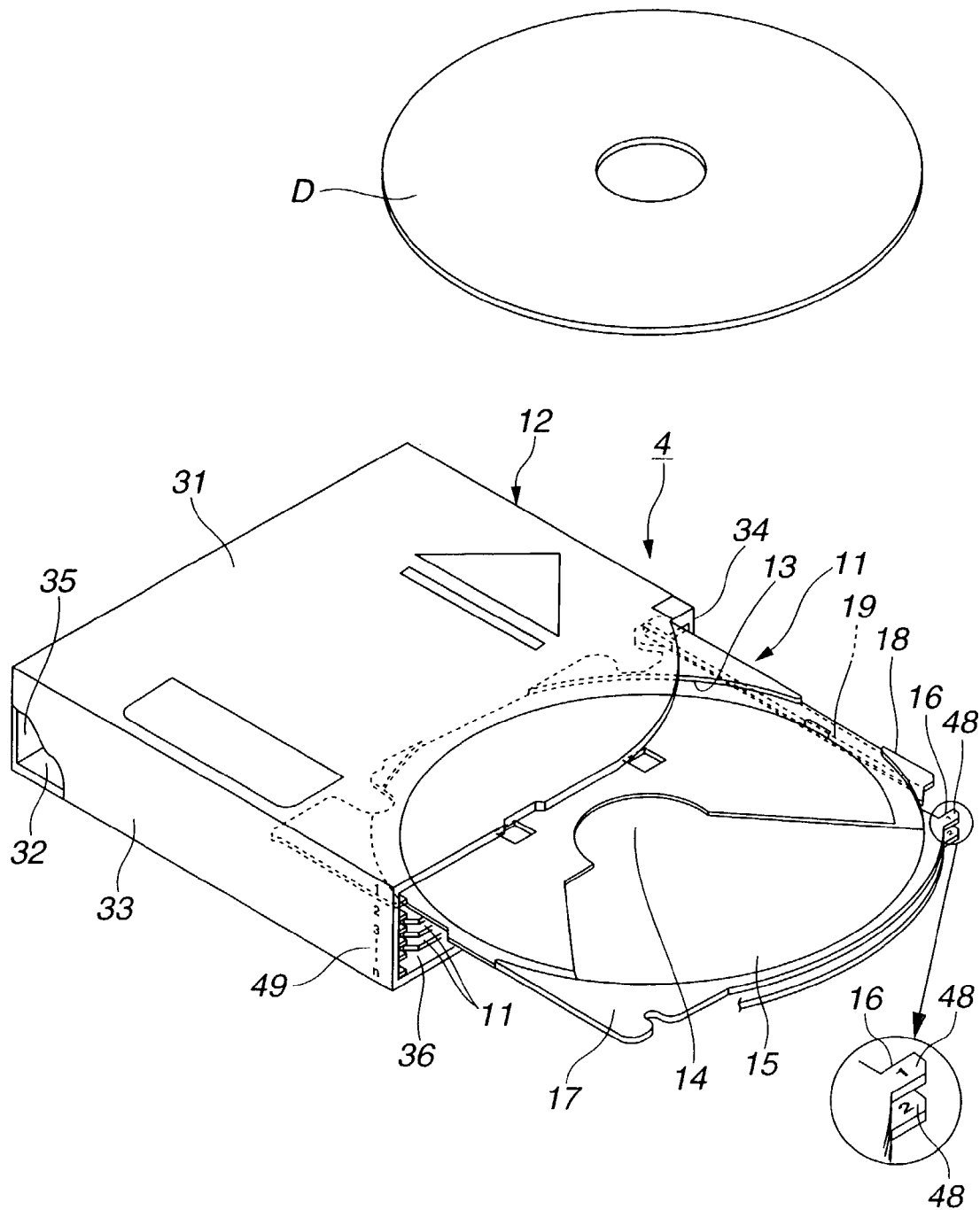
FIG. 2 is a perspective view of the disk cartridge.

FIG. 2 is a perspective view of the disk cartridge 4. The disk cartridge 4 comprises a plurality of trays 11, . . . 11 each for disposing thereon the disk D, and a casing 12 having the trays 11, . . . 11 mounted therein to allow drawing-out thereof.

The tray 11 has a disk positioning concave 13 for disposing thereon the disk D in the engaged state, and includes a disk-table introducing recess 14 extending from the center of the concave 13 to one side and a pick-up moving recess 15. The tray 11 is provided, at one side on the front end (drawing end), with an operating portion (refer hereinafter to as hook portion) 16 engaged with a tray engaging portion (refer hereinafter to as hook engaging portion) 91 of the loading mechanism 7 as will be described later.

The top face of the hook portion 16 of each tray 11, . . . 11 forms a display portion 48 for indicating which position the tray occupies from the top (or from the bottom). The display portion 48 is provided with serial numbers from 1 to n from the highest tray in order.

Moreover, the casing 12 is also provided, at one side at the positions corresponding to the highest tray through the lowest tray, with a display portion 49 for indicating which position the tray occupies. The display portion 49 is also provided with serial numbers from 1 to n as in the case of the above-mentioned trays.

Figure 3:
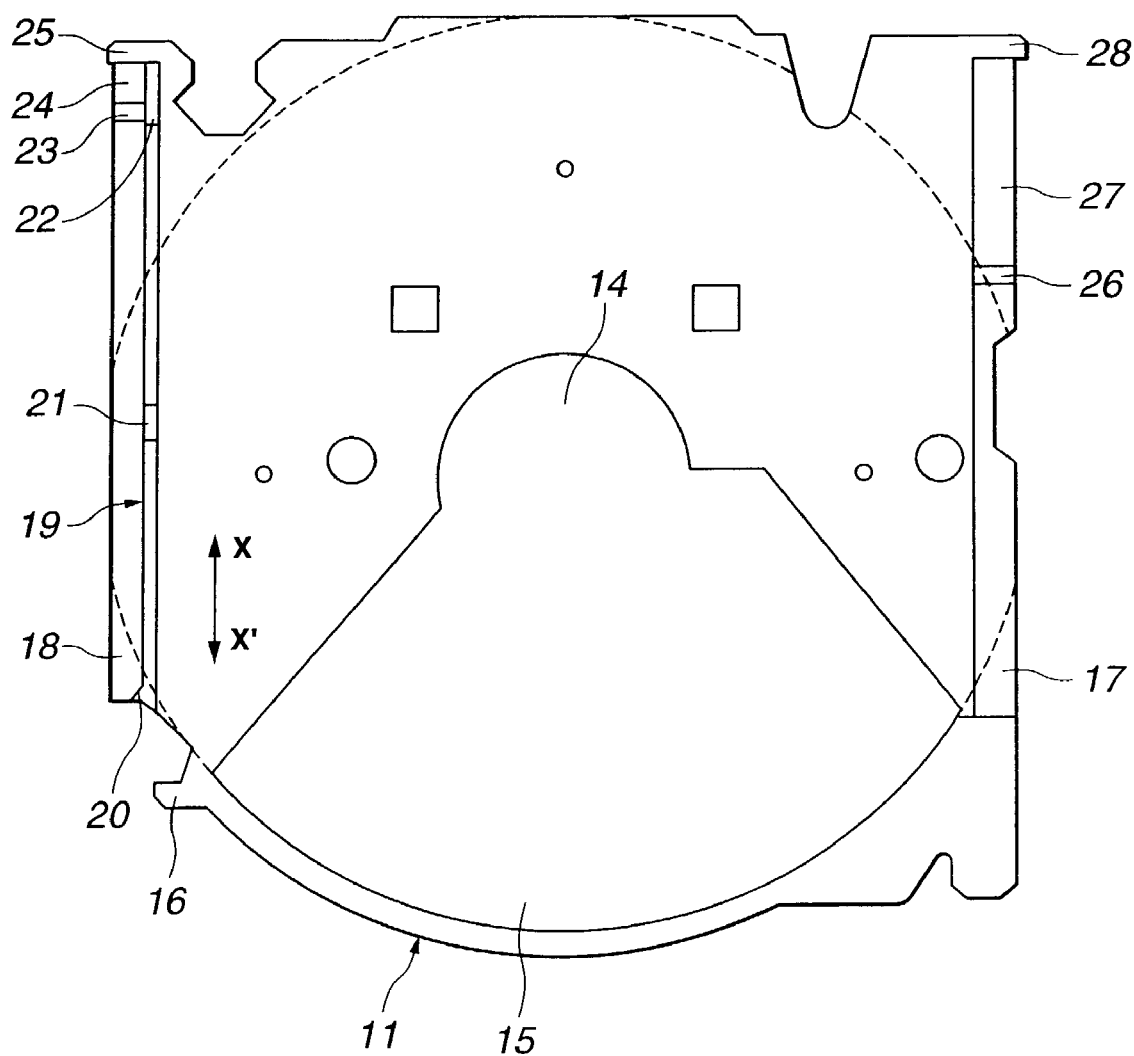
FIG. 3 is a plan view of the tray as seen from the bottom.

FIG. 3 is a plan view of the tray 11 as seen from the back. The tray 11 comprises, on the left and right side portions of the back, a pair of first and second supported portions 17, 18 supported by a pair of first and second shelf-like tray support portions 42, 43 arranged in the casing 12 as will be described later.

A slide guide 9 (see FIG. 4) for guiding slide motion of the tray is arranged between the second supported portion 18 and the second tray support portion 43 for supporting it. The slide guide 9 comprises a long groove-like concave 19 arranged in the underside of the second supported portion 18 of the tray 11, and a guide protrusion 46 arranged on the top face of the second tray support portion 43 of the casing 12. The long groove-like concave 19 is formed on a substantially same line with the hook portion 16 with respect to the tray access direction X–X'.

The long groove-like concave 19 includes a divergent tapered surface 20 at an end on the side of the hook portion 16, a first hole 21 at the center, and a second hole 22 at another end. The second supported portion 18 includes a downward inclined surface 23 on the side face of the second hole 22, a first hollow portion 24 continuously connected to the inclined surface 23, and a first stopper portion 25 continuously connected to the first hollow portion 24.

Like the second supported portion 18, the first supported portion 17 includes a downward inclined surface 26, a second hollow portion 27 continuously connected to the inclined surface 26, and a second stopper portion 28 continuously connected to the second hollow portion 27.

As shown in FIG. 2, the casing 12 is formed like a flat box shape by a top plate 31, a bottom plate 32, a left side plate 33, a right side plate 34, and a back plate 35 to allow loading and unloading of the trays 11, ... 11 through the front-end opening 36.

The casing 12 has one side portion of the opening 36 cut to be in the rounded state so called. The hook portion 16 of each tray 11, ... 11 is exposed outside the casing 12 from the rounded portion.

Figure 4:
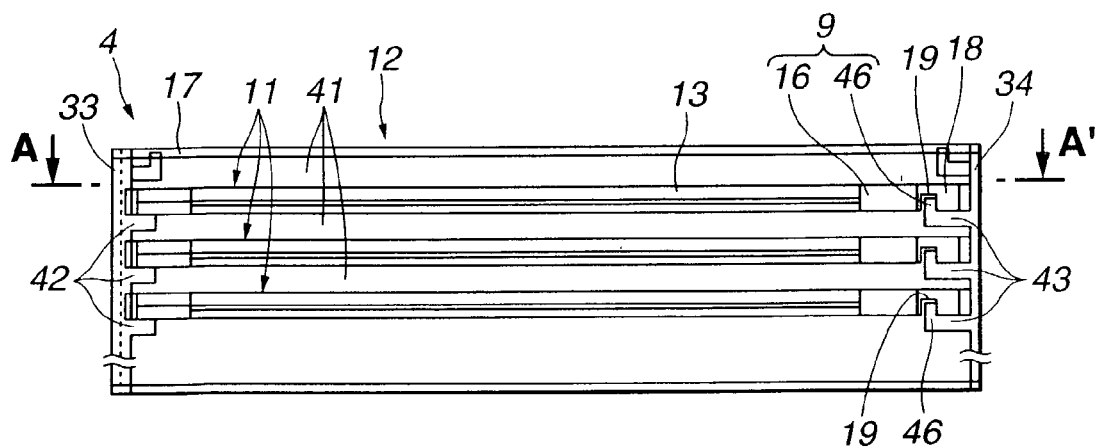
FIG. 4 is a front view of the disk cartridge.

FIG. 4 is a front view of the disk cartridge 4. The casing 12 comprises a plurality of disk housings 41, ... 41 each for containing the tray 11 in a drawable way. The disk housing 41 is formed by providing a pair of first and second shelf-like tray support portions 42, 43 at the opposite positions on the inner surface of the left and right side plates 33, 34.

Figure 5:
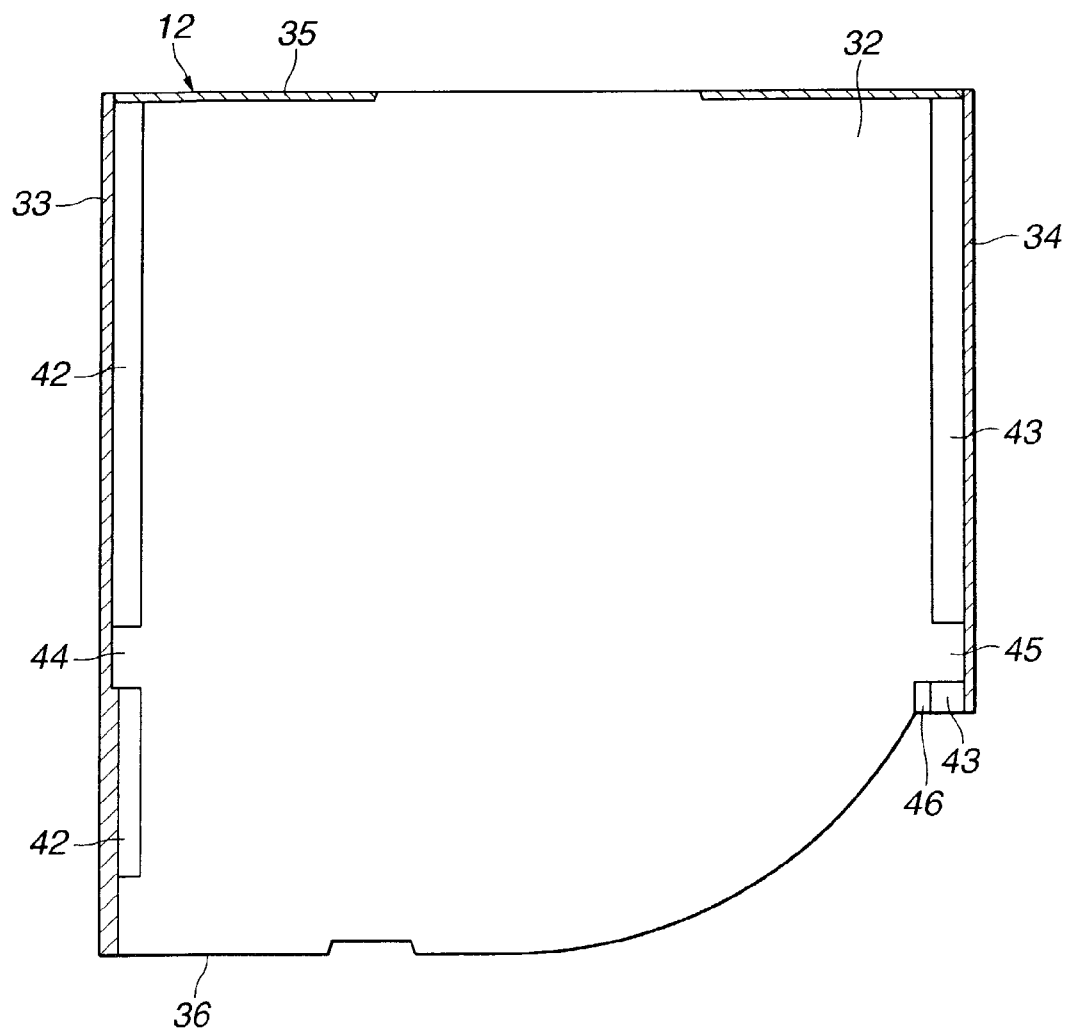
FIG. 5 is an A–A' sectional view in FIG. 4 with the tray removed.

FIG. 5 is an A–A' sectional view with the trays 11 in FIG. 4 being removed. The first and second tray support portions 42, 43 serve to horizontally support the first and second supported portions 17, 18 of the tray 11 as described above.

The first tray support portion 42 is provided with a first recess 44 at the position closer to the front end (opening 36) than the center in the length direction. The second tray support portion 43 is provided with a second recess 45 at the position opposite to the first recess 44, and a guide protrusion 46 (refer hereinafter to the guide protrusion of the disk cartridge 4 as guide protrusion) on the inner side at the front end so as to enter the long groove-like concave 19 provided in the underside of the tray 11. The first guide protrusion 46 is formed to have a size which does not allow engagement with the first hole 21 provided at the center of the concave 19, but allow engagement with the second hole 22.

Figure 6:
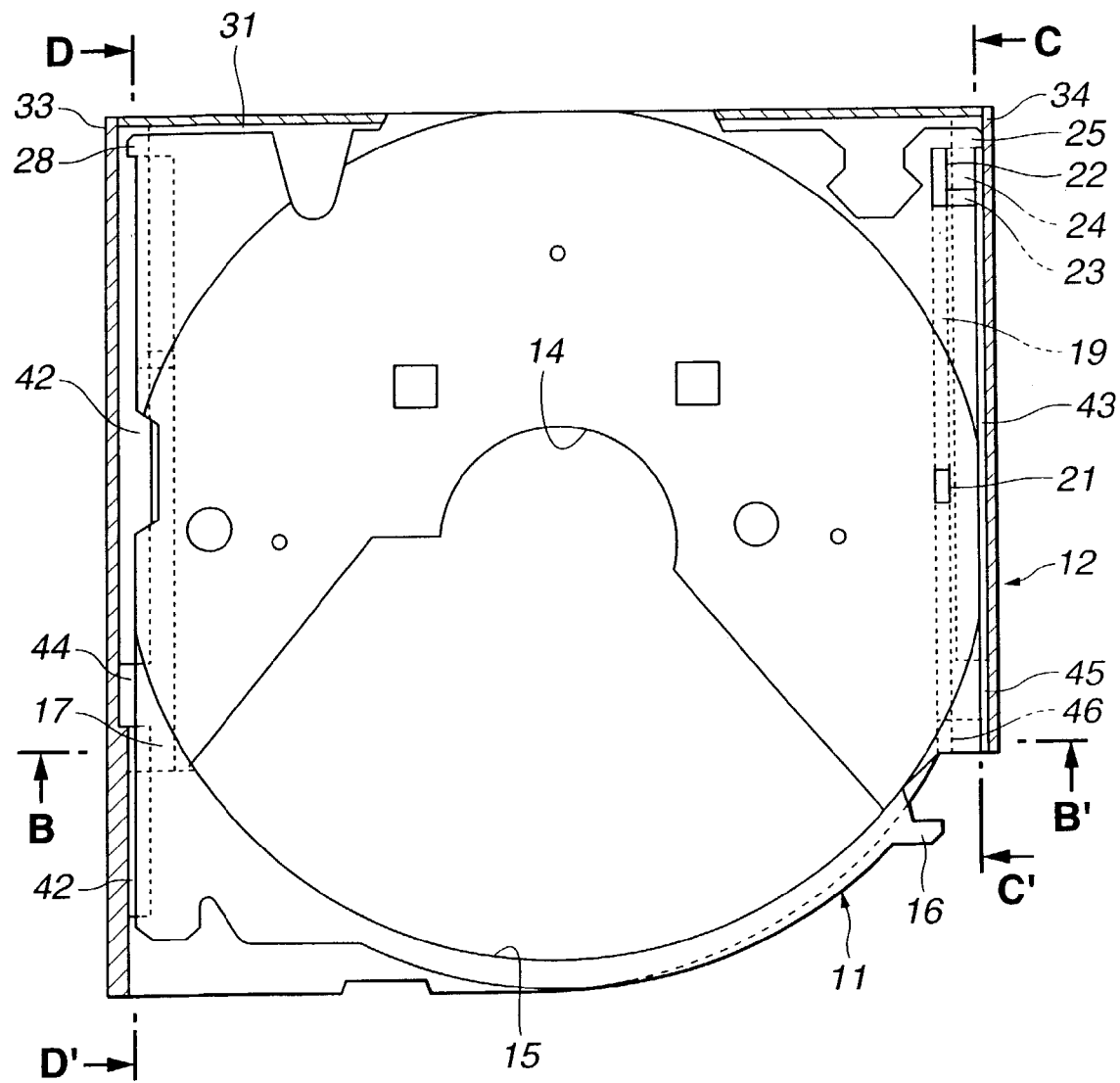
FIG. 6 is an A–A' sectional view in FIG. 4.
Figure 7:
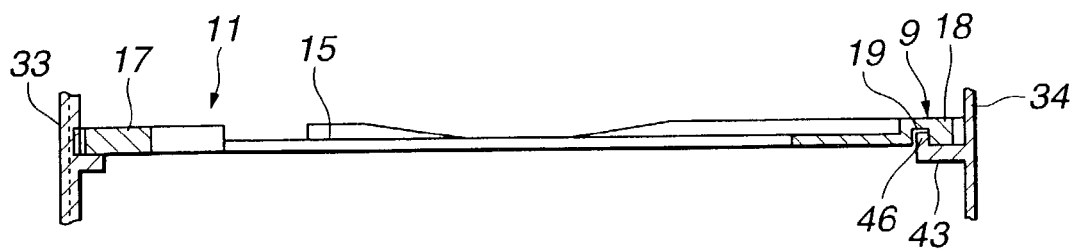
FIG. 7 is a B–B' sectional view of the main portion in FIG. 6.
Figure 8:
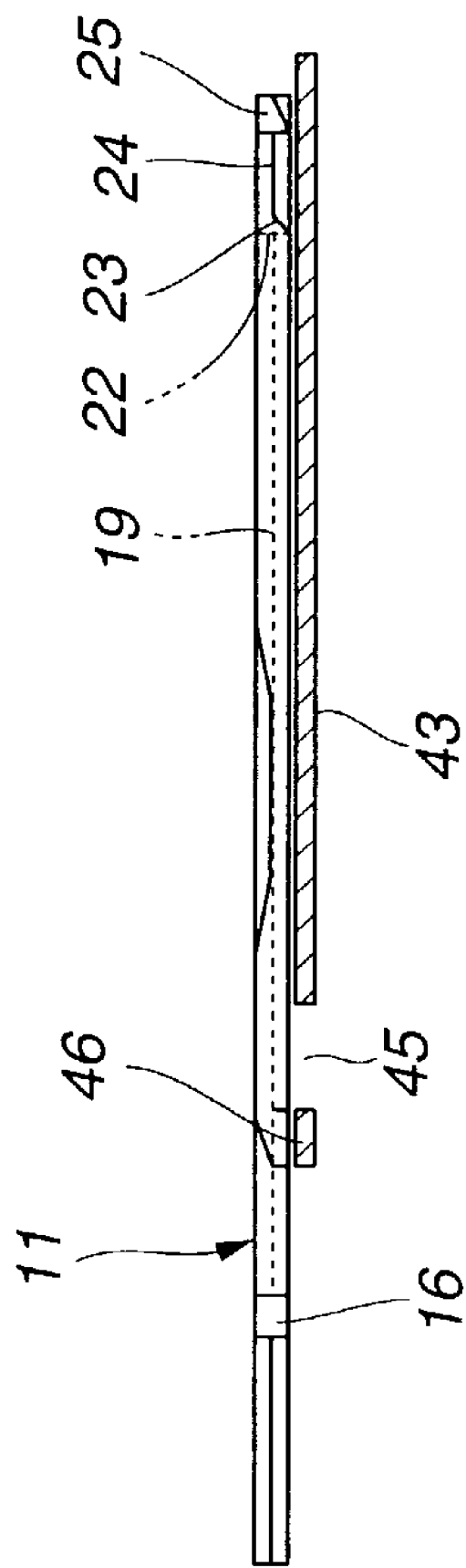
FIG. 8 is a C–C' sectional view of the main portion in FIG. 6.
Figure 9:
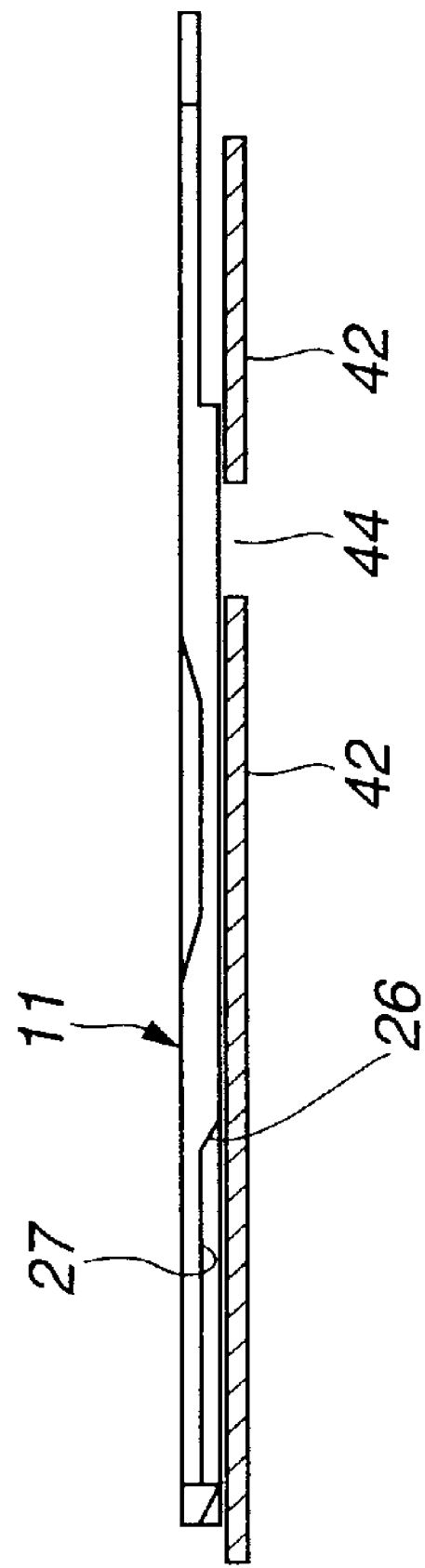
FIG. 9 is a D–D' sectional view of the main portion in FIG. 6.

FIG. 6 is a sectional view (A–A' sectional view in FIG. 4) showing the tray 11 contained in the casing 12. FIG. 7 is a B–B' sectional view of the main portion in FIG. 6. FIG. 8 is a C–C' sectional view of the main portion in FIG. 6. FIG. 9 is a D–D' sectional view of the main portion in FIG. 6. With the tray 11 contained in the casing 12, the first and second supported portions 17, 18 are placed on the first and second tray support portions 42, 43 of the casing 12. And the first guide protrusion 46 provided on the first tray support portion 43 is engaged with the long groove-like concave 19 provided in the tray 11, forming the slide guide 9 as described above.

In the state as shown in FIG. 6, when the tray 11 is drawn with a fingertip hitched to the hook portion 16 of the tray 11 or the hook engagement portion 91 of the loading mechanism 7 engaged therewith, as will be described later, the tray 11 is drawn out from the casing 12 through the long groove-like concave 19 and the first guide protrusion 46 straight and without inclining rightward or leftward.

Figure 10:
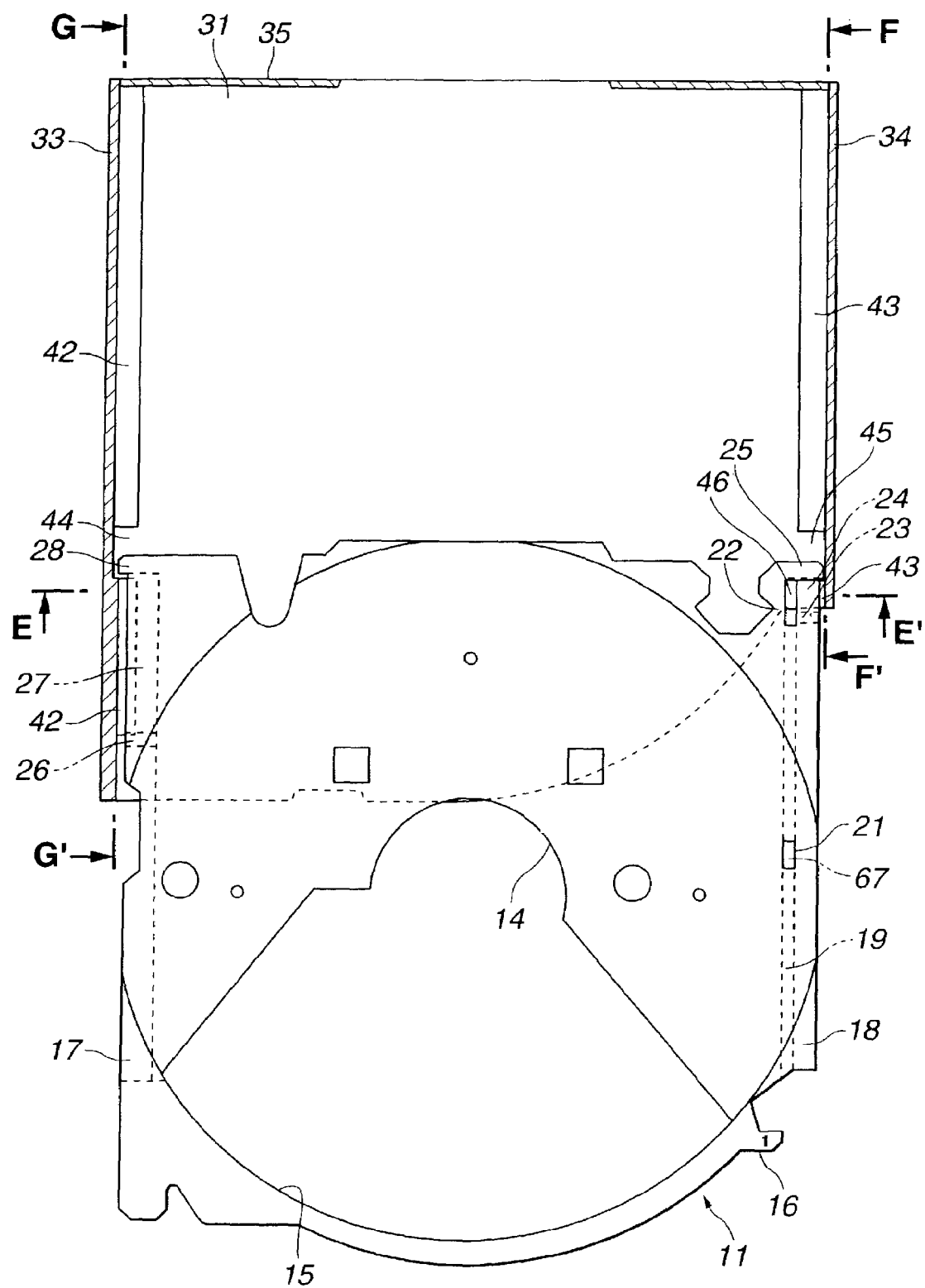
FIG. 10 is a sectional view of the main portion with the tray drawn out.
Figure 11:
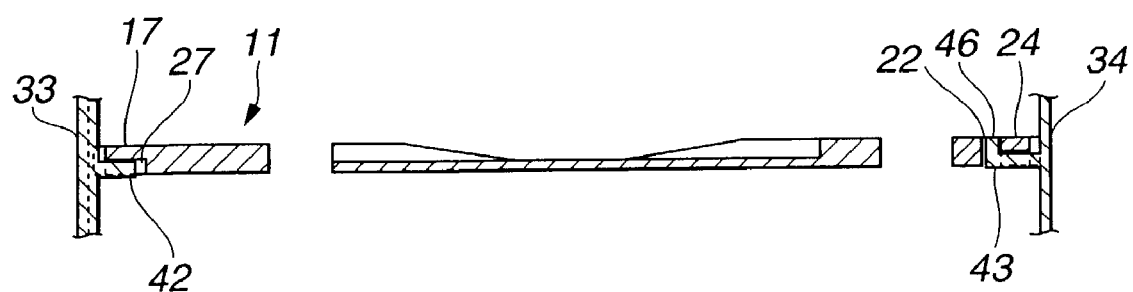
FIG. 11 is an E–E' sectional view of the main portion in FIG. 10.
Figure 12:
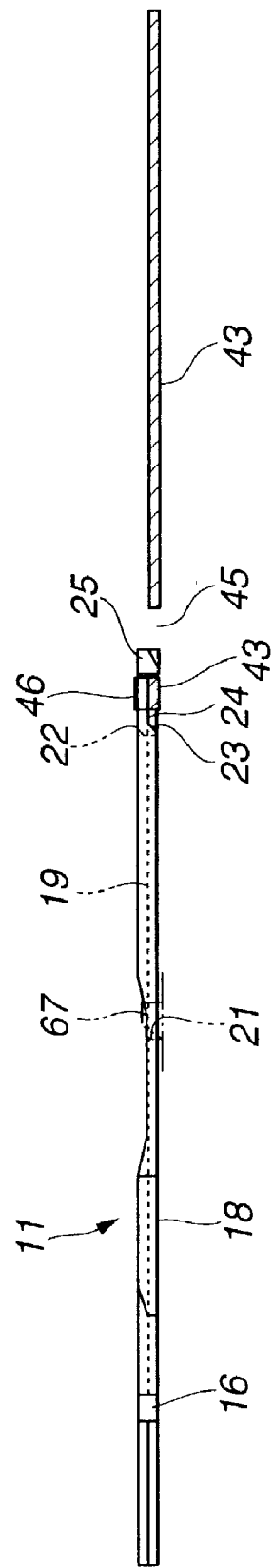
FIG. 12 is an F–F' sectional view of the main portion in FIG. 10.
Figure 13:
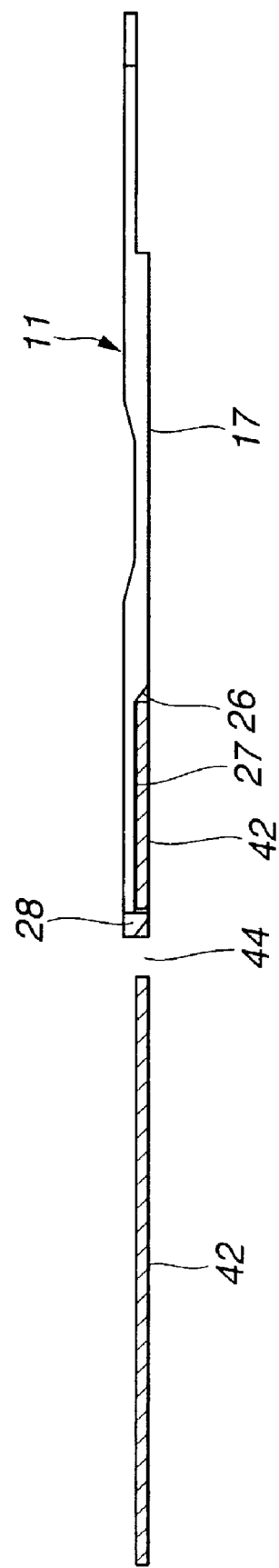
FIG. 13 is a G–G' sectional view of the main portion in FIG. 10.

FIG. 10 is a sectional view showing the tray 11 corresponding to FIG. 6, drawn out from the casing 12 by a predetermined amount. FIG. 11 is an E–E' sectional view of the main portion in FIG. 10. FIG. 12 is an F–F' sectional view of the main portion in FIG. 10. FIG. 13 is a G–G' sectional view of the main portion in FIG. 10. When the tray 11 is drawn out from the casing 12 by a predetermined amount, the first and second stopper portions 25, 28 of the tray 11 are introduced into the first and second recesses 44, 45 provided in the first and second tray support portions 42, 43 of the casing 12, and the first and second tray support portions 42, 43 forward of the first and second recesses 44, 45 of the casing 12 are introduced into the first and second hollow portions 24, 27 continuously connected to the first and second stopper portions 25, 28. Then, the tray 11 is put in the state where the top faces of the first and second hollow portions 24, 27 are supported by the first and second tray support portions 42, 43, and the guide protrusion 46 provided on the casing 12 is engaged with the second hole 22 provided in the tray 11, obtaining the state where the tray 11 is prevented from dropping from the casing 12.

(3) Description of Elevator

The elevating unit or elevator is disposed opposite to the opening 36 of the disk cartridge, and is moved up and down to the position of a desired disk housing by the up-and-down movement control mechanism, wherein a disk disposed on the tray drawn out from the disk cartridge by the loading mechanism is chucked onto the disk table by the disk chucking mechanism to perform recording and/or reproducing of the disk through the recording and/or reproducing portion such as an optical pickup.

Figure 14:
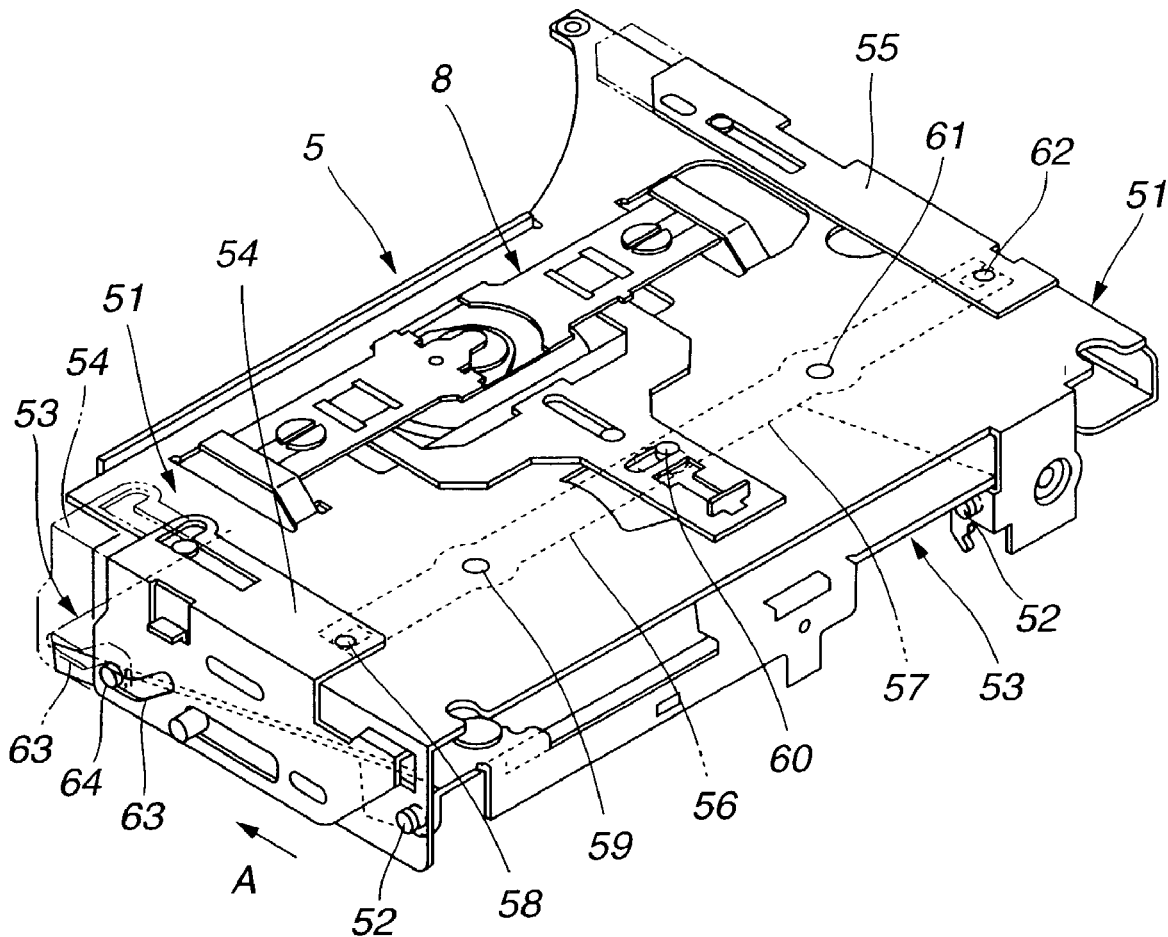
FIG. 14 is a perspective view of the elevator.
Figure 15:
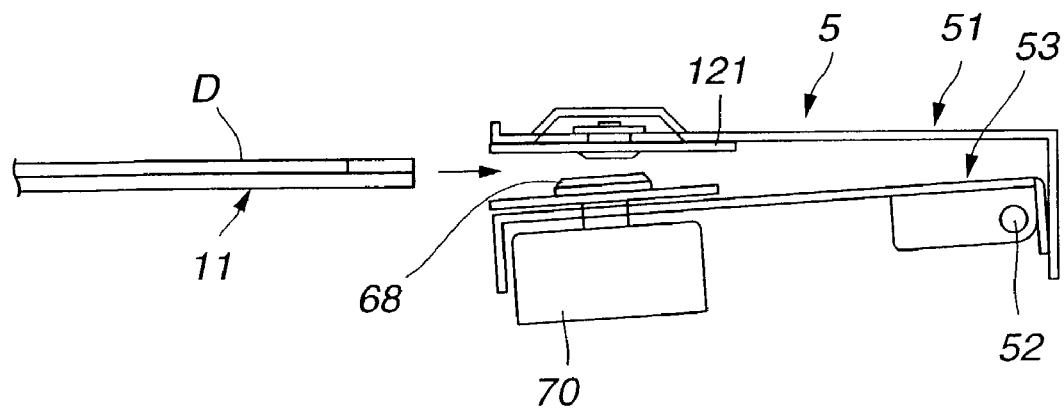
FIG. 15 is a sectional view of the main portion.
Figure 16:
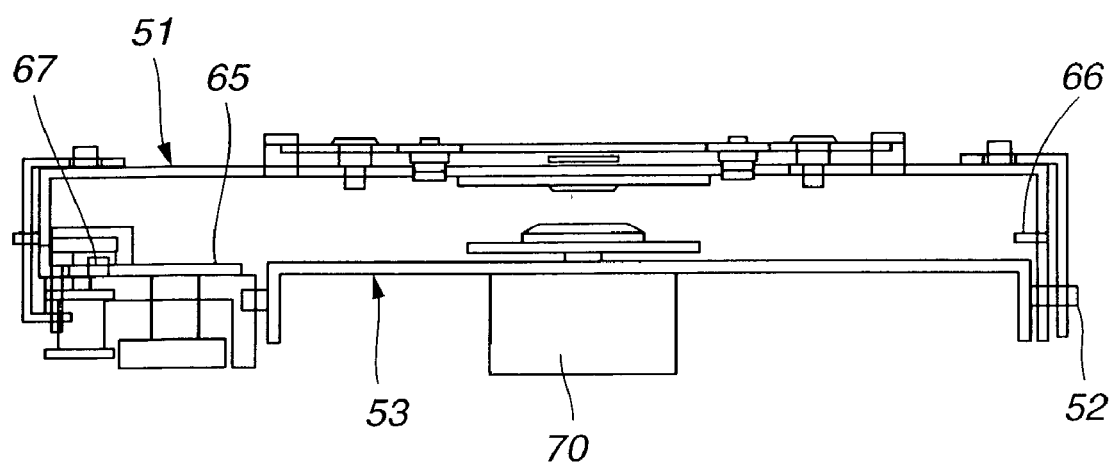
FIG. 16 is a front view of the main portion.
Figure 17A:
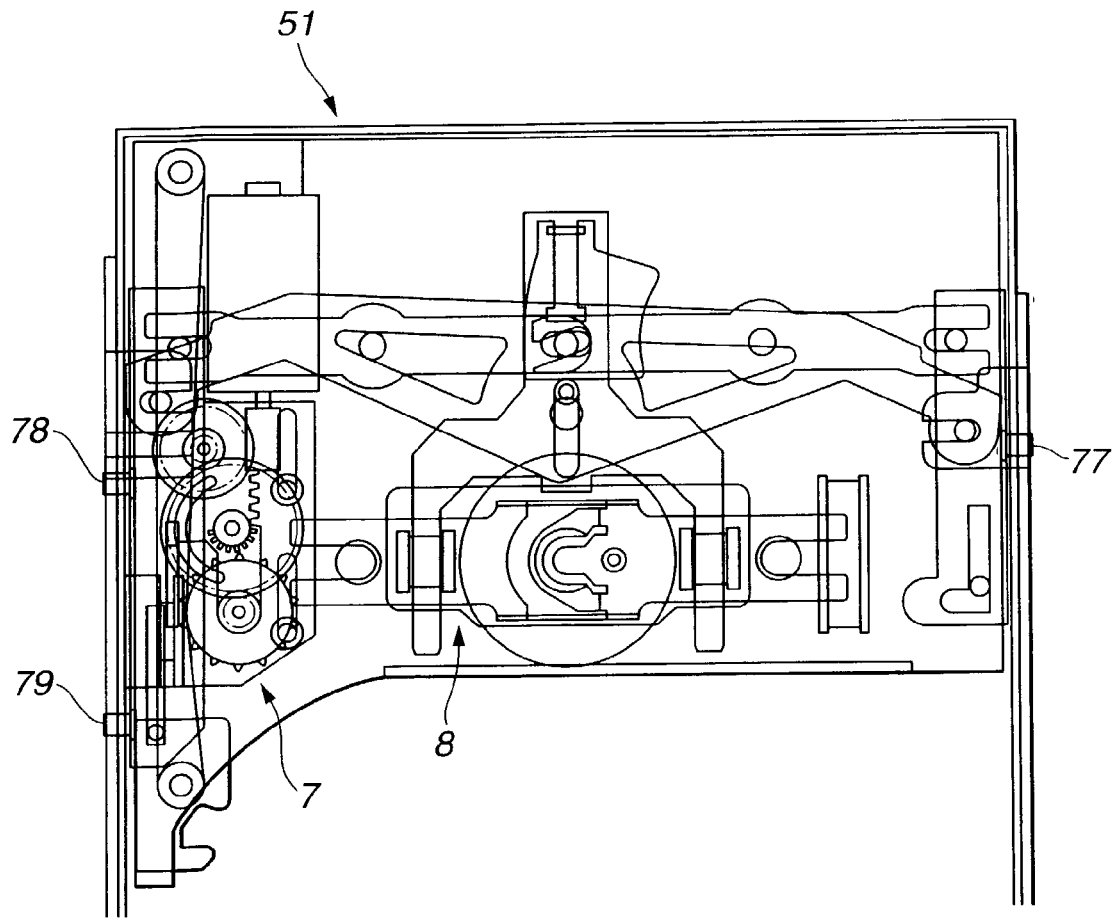
FIG. 17A is a plan view of the upper block portion.
Figure 17B:
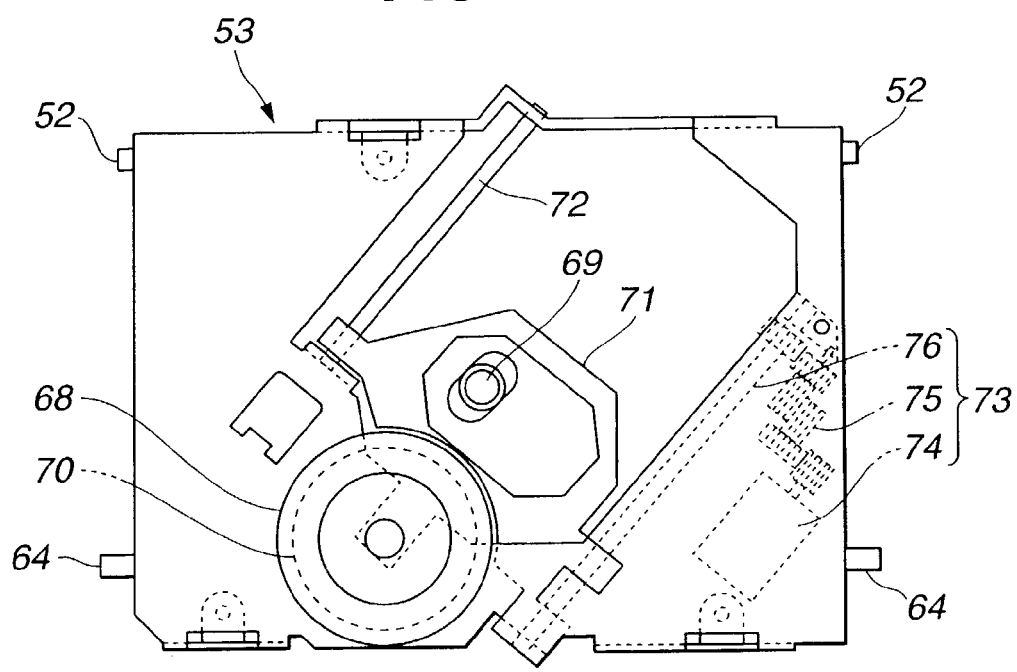
FIG. 17B is a plan view of the lower block portion.

FIG. 14 is a perspective view of the elevator 5. FIG. 15 is a sectional view of the main portion in FIG. 14. FIG. 16 is a front view of the elevator. FIGS. 17A and 17B are plan views of an upper block portion 51 and a lower block portion 53 which constitute the elevator 5.

As shown in FIG. 14 and FIG. 15, the elevator 5 comprises upper block portion 51, lower block portion 53 rotatably mounted to the upper block portion 51 by a first shaft 52, first and second lower-block rotation operating units 54, 55 slidably mounted to both end portions of the upper block portion 51, and first and second link levers 56, 57 for linking the first and second lower-block rotation operating units 54, 55 to synchronously move them in the same direction. The first link lever 56 has one end connected to the first lower-block rotation operating unit 54 by a first shaft 58, a center rotatably mounted to the underside of the upper block portion 51 by a second shaft 59, and another end connected to one end of the second link lever 57 by a third shaft (refer hereinafter to as connecting pin) 60.

The second link lever 58 has a center rotatably connected to the underside of the upper block portion 51 by a fourth shaft 61 and another end portion connected to the second lower-block rotation operating unit 55 by a fifth shaft 62.

When sliding one of the first and second lower-block rotation operating units 54, 55, another is urged to slide in the same direction through the first and second link levers 56, 57.

The first and second lower-block rotation operating units 54, 55 have an inclined operation groove 63 in which the second shaft 64 provided on another end of the lower block portion 53 (opposite end of the first shaft 52) is inserted. As shown by the solid line in FIG. 14, with the second shaft 64 positioned at a lower end of the inclined operation groove 63, a free end of the lower block portion 53 is inclined downward about the first shaft 52 as shown in FIG. 15. And when insertion of the tray is completed, the first and second lower-block rotation operating units 54, 55 are moved in the direction of arrow A as shown by the two-dot chain line in FIG. 14 to position the second shaft 64 at an upper end of the inclined operation groove 63, thus raising and maintaining the lower block portion 53 substantially horizontally.

As shown in FIG. 16, the upper block portion 51 comprises on the left and right sides a pair of tray support portions (refer hereinafter to the tray support portions of the elevator as third and fourth tray support portions) 65, 66. The third and fourth tray support portions 65, 66 serve to support the first and second supported portions 17, 18 on both sides of the tray 11 drawn out from the disk cartridge 4.

The third tray support portion 65 comprises a guide protrusion (refer hereinafter to the guide protrusion of the elevator as second guide protrusion) 67 which enters the long groove-like guide portion 19 of the tray 11 drawn out from the disk cartridge 4 to guide drawing-in of the tray 11.

When drawing the tray 11 into the elevator 5 most deeply, the second guide protrusion 67 is engaged with the second hole-21 provided at the center of the long groove-like concave 19 of the tray 11 as shown in FIG. 12, thus allowing the tray 11 to lower by about 1 mm.

As shown in FIG. 17A, the upper block portion 51 is equipped with loading mechanism 7 and disk chucking mechanism 8. As shown in FIG. 17B, the lower bock portion 53 includes a disk table 68, a disk rotating/driving mechanism and optical pickup 69 comprising a spindle motor 70 for rotating and driving the disk table 68, and a disk recording and/or reproducing portion comprising an optical block such as a carriage 71 equipped with the optical pickup 69. The carriage 71 moves the optical pickup 69 along a guide shaft 72. Moreover, the carriage 71 is driven by a carriage drive mechanism 73. The carriage drive mechanism 73 comprises a motor 74, a gear train 75, and a lead screw 76, wherein by rotating the lead screw 76 by the motor 74 through the gear train 75, the carriage 71 is moved along the guide shaft 72 to move the optical pickup 69 mounted on the carriage 71 in the radial direction of the disk D chucked on the disk table 68.

Figure 18:
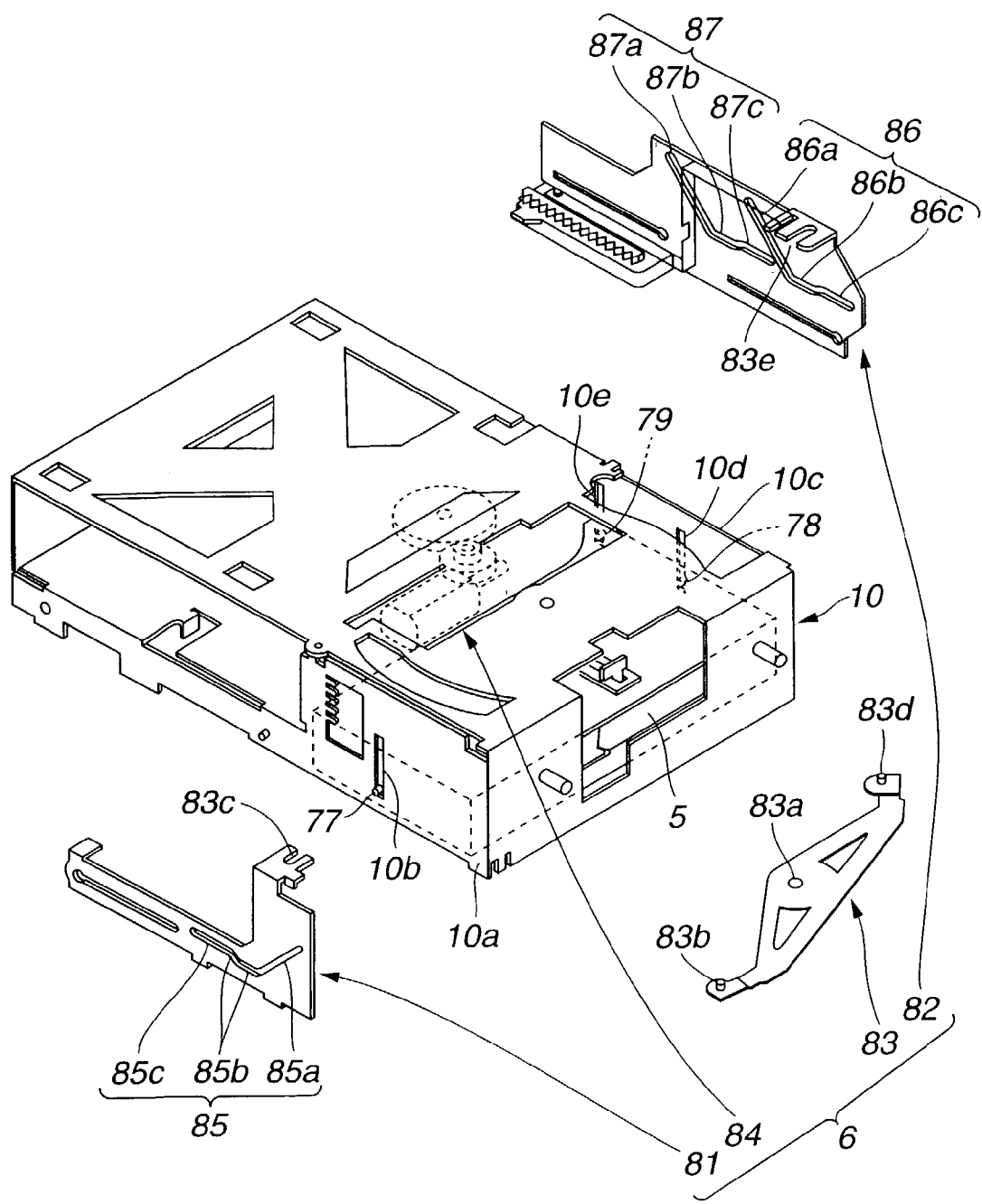
FIG. 18 is an exploded perspective view of the up-and-down movement control mechanism.

As shown in FIG. 18, the elevator 5 comprises a first supported shaft 77 on one side face and second and third supported shafts 78, 79 on another side face. By inserting the first supported shaft 77 in the first up-and-down movement guide groove 10b provided in a first side face 10a of the mechanical chassis 10 and inserting the second and third supported shafts 78, 79 in the up-and-down movement guide grooves 10d, 10e provided in a second side face 10c of the mechanical chassis 10, the elevator 5 is mounted to the mechanical chassis 10 to be movable up and down in the vertical direction.

The elevator 5 is moved up and down to the position of a desired tray 11 in the disk cartridge 4 by the up-and-down movement control mechanism 6 as will be described below so as to drawn out the tray 11 and chuck the disk D on the disk table 68, performing disk recording and/or reproducing by the recording and/or reproducing portion such as optical pickup.

(4) Description of Up-and-Down Movement Control Mechanism

The up-and-down movement control mechanism serves to move up and down the elevator to the position of a desired tray in the disk cartridge.

Figure 19:
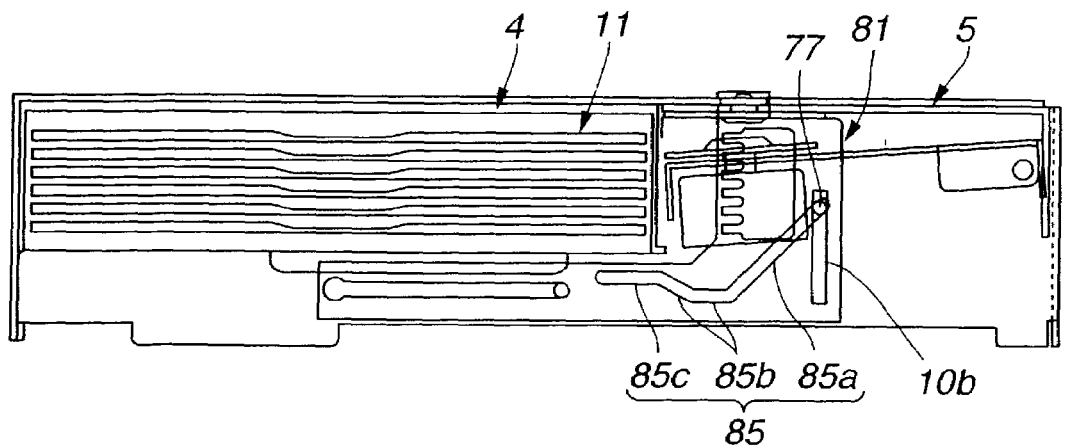
FIG. 19 is a side view when the elevator is moved upward at the position corresponding to the highest tray.
Figure 20:
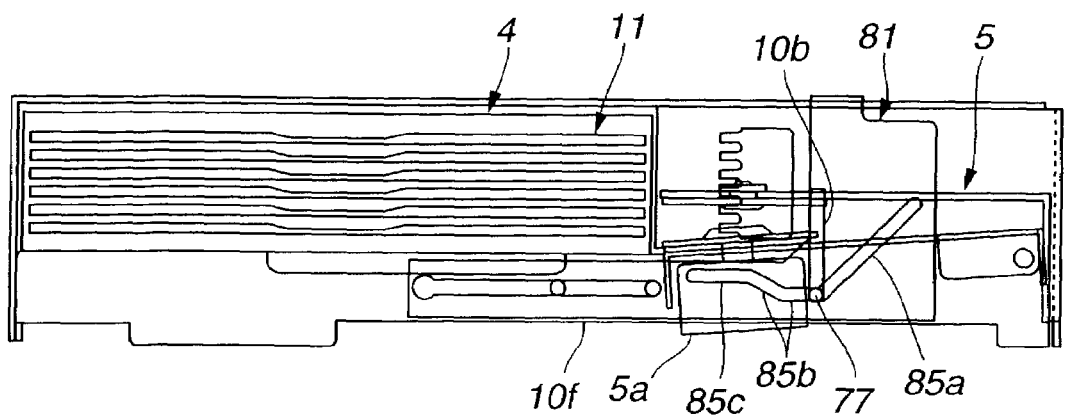
FIG. 20 is a side view when the elevator is moved upward at the position corresponding to the lowest tray.
Figure 21:
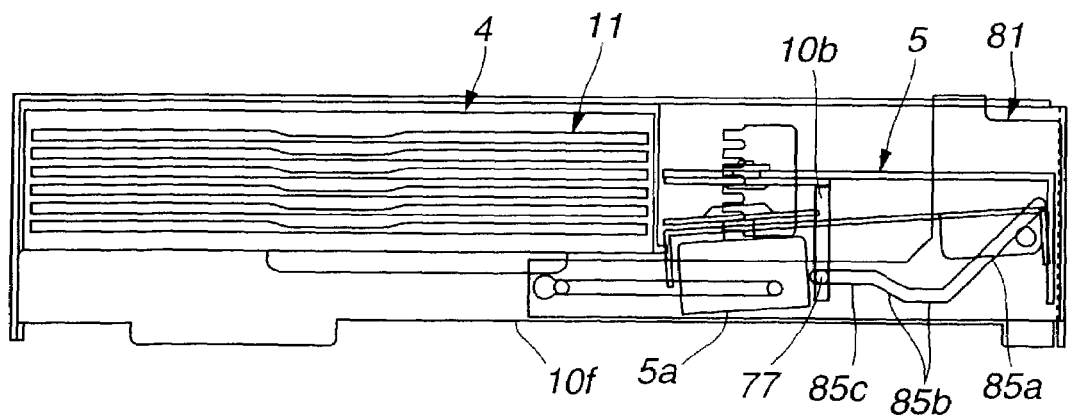
FIG. 21 is a side view when the elevator is at the standby position.

FIG. 18 is an exploded perspective view of the up-and-down movement control mechanism. FIG. 19 is a side view showing the elevator moved to the position corresponding to the highest tray in the disk cartridge. FIG. 20 is a side view showing the elevator moved to the position corresponding to the lowest tray in the disk cartridge. FIG. 21 is a side view showing the elevator waiting at the standby position.

As shown in FIG. 18, the up-and-down movement control mechanism 6 comprises a first up-and-down movement operating plate 81 slidably placed on the outside surface of the first side face 10a of the mechanical chassis 10, a second up-and-down movement operating plate 82 slidably placed on the outside surface of the second side face 10c of the mechanical chassis 10, a link lever 83 for linking the first and second up-and-down movement operating plates 81, 82, and an operating-plate drive mechanism 84 for sliding the second up-and-down movement operating plate 82.

The first up-and-down movement operating plate 81 comprises a first operation groove 85 for supporting the first supported shaft 77 of the elevator 5 at the point of intersection with the first up-and-down movement guide groove 10b provided in the first side face 10a of the mechanical chassis 10.

The first operation groove 85 is provided with an inclined up-and-down movement operating groove portion 85a and a horizontal standby groove portion 85c connected to a lower end of the up-and-down movement operating groove portion 85a through a communicating groove portion 85b.

As shown in FIG. 19, with the first supported shaft 77 positioned at an upper end of the inclined up-and-down movement operating groove portion 85a, the first up-and-down movement operating plate 81 supports the elevator 5 at the position corresponding to the highest tray 11 in the disk cartridge 4.

As shown in FIG. 20, with the first supported shaft 77 positioned at the lower end of the inclined up-and-down movement operating groove portion 85a, the first up-and-down movement operating plate 81 supports the elevator 5 at the position corresponding to the lowest tray 11 in the disk cartridge 4. In this case, a lower end 5a of the elevator 5 protrudes from a lower end 10f of the mechanical chassis 10.

As shown in FIG. 21, with the first supported shaft 77 positioned at the horizontal standby groove portion 85c, the first up-and-down movement operating plate 81, together with the second up-and-down movement operating plate 82 as will be described below, moves the elevator 5 upward from the position corresponding to the lowest tray 11 to the position where the lower end 5a of the elevator 5 does not protrude from the lower end 10f of the mechanical chassis 10 (position where it is contained in the mechanical chassis 10), achieving its standby state.

As shown in FIG. 18, the second up-and-down movement operating plate 82 comprises a second operation groove 86 for supporting the second supported shaft 78 of the elevator 5 at the point of intersection with the second up-and-down movement guide groove 10d provided in the second side face 10c of the mechanical chassis 10 and a third operation groove 87 for supporting the third supported shaft 79 of the elevator 5 at the point of intersection with the third up-and-down movement guide groove 10e.

Like the first operation groove 85, the second operation groove 86 is provided with an inclined up-and-down movement operating groove portion 86a and a horizontal standby groove portion 86c connected to a lower end of the up-and-down movement operating groove portion 86a through a communicating groove portion 86b.

Like the second operation groove 86, the third operation groove 87 is provided with an inclined up-and-down movement operating groove portion 87a and a horizontal standby groove portion 87c connected to a lower end of the up-and-down movement operating groove portion 87a through a communicating groove portion 87b.

With the second and third supported shafts 78, 79 positioned at upper ends of the inclined up-and-down movement operating groove portions 86a, 87a of the second and third operation grooves 86, 87, the second up-and-down movement operating plate 82, together with the first up-and-down movement operating plate 81, supports the elevator 5 at the position corresponding to the highest tray 11 in the disk cartridge 4. With the second and third supported shafts 78, 79 of the elevator 5 positioned at lower ends of the up-and-down movement operating groove portions 86a, 87a, the second up-and-down movement operating plate 82 supports the elevator at the position corresponding to the lowest tray 11 in the disk cartridge 4. And with the second and third supported shafts 78, 79 of the elevator 5 positioned at the horizontal standby groove portions 86c, 87c, the second up-and-down movement operating plate 82 moves the elevator 5 upward from the position corresponding to the lowest tray 11 to the position where the lower end 5a of the elevator 5 does not protrude from the lower end 10f of the mechanical chassis 10 (position where it is contained in the mechanical chassis), achieving its standby state.

The second and third operation grooves 86, 87 are formed in the opposite direction to the first operation groove 85, and move up and down the elevator 5 by sliding the first up-and-down movement operating plate 81 and the second up-and-down movement operating plate 82 in the directions opposite to each other.

The link lever 83 has a center rotatably mounted to the mechanical chassis 10 by a shaft 83a, one end connected to the first up-and-down movement operating plate 81 by a first pin 83b and a slot 83c, and another end connected to the second up-and-down movement operating plate 82 by a second pin 83d and a slot 83e.

When sliding the first up-and-down movement operating plate 81 in one direction by the operating-plate drive mechanism 84, the link lever 83 rotates about the shaft 83a to slide the second up-and-down movement operating plate 82 in the opposite direction in synchronism with the first up-and-down movement operating plate 81.

The up-and-down movement control mechanism 6 in the embodiment has the structure as described above, and performs control such that when the first up-and-down movement operating plate 81 is moved to the leftmost position as shown in FIG. 19, the second up-and-down movement operating plate 82 is moved to the rightmost position on the side of the side face 10c of the mechanical chassis 10. It supports the first supported shaft 77 of the elevator 5 at the upper end of the inclined up-and-down movement operating groove portion 85a of the first operation groove 85 of the first up-and-down movement operating plate 81, and also the second and third supported shafts 78, 79 of the second up-and-down movement operating plate 82, thus supporting the elevator 5 at the position corresponding to the highest tray 11 in the disk cartridge 4.

When moving the first up-and-down movement operating plate 81 rightward by predetermined amounts from the state as shown in FIG. 19, the second up-and-down movement operating plate 82 moves leftward in synchronism therewith to move the elevator 5 to the position corresponding to the second tray, third tray, . . . from the top in the disk cartridge 4.

As shown in FIG. 20, when the first supported shaft 77 of the elevator 5 is supported at the lower end of the inclined up-and-down movement operating groove portion 85a of the first operation groove 85 of the first up-and-down movement operating plate 81, the second and third supported shafts 78, 79 of the elevator 5 are supported at the lower end of the inclined up-and-down movement operating groove portions 86a, 87a of the second and third operation grooves 86, 87 of the second up-and-down movement operating plate 82, thus obtaining the elevator 5 supported at the position corresponding to the lowest tray.

When moving the first up-and-down movement operating plate 81 further rightward by a predetermined amount from the state as shown in FIG. 20, the second up-and-down movement operating plate 82 also moves rightward in synchronism therewith, so that the first, second, and third supported shafts 77, 78, 79 are introduced into the standby groove portions 85c, 86c, 87c of the first, second, and third operation grooves 85, 86, 87, thus obtaining the lower end 5a of the elevator 5 supported at the standby position above at least the lower end 10f of the mechanical chassis 10.

(5) Description of Loading Mechanism

The loading mechanism serves to carry a tray (disk) out of the disk cartridge to the elevator, and carry or return the tray from the elevator into the disk cartridge.

Figure 22:
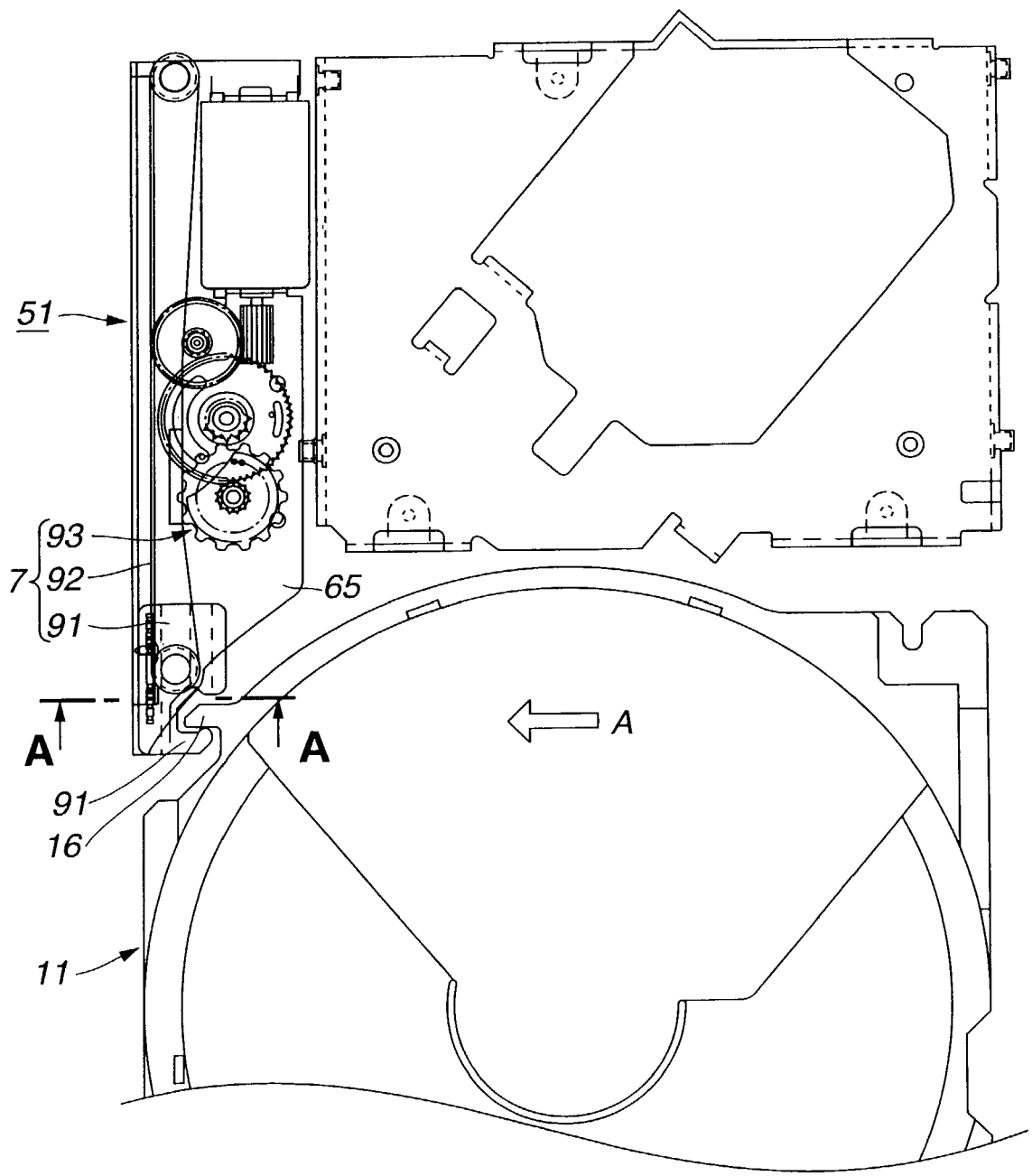
FIG. 22 is a plan view of the loading mechanism.
Figure 23:
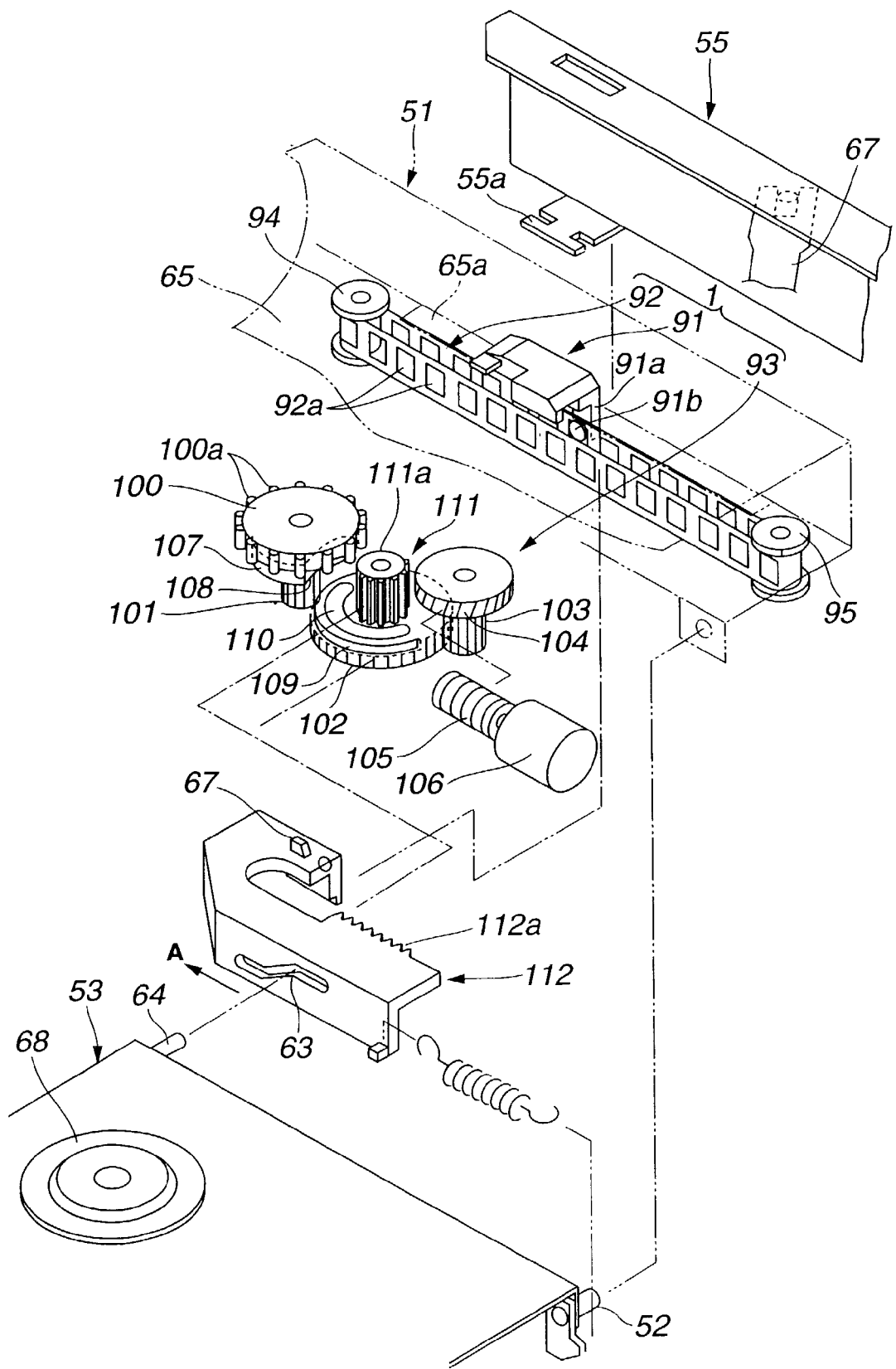
FIG. 23 is an exploded perspective view of the loading mechanism.
Figure 24:
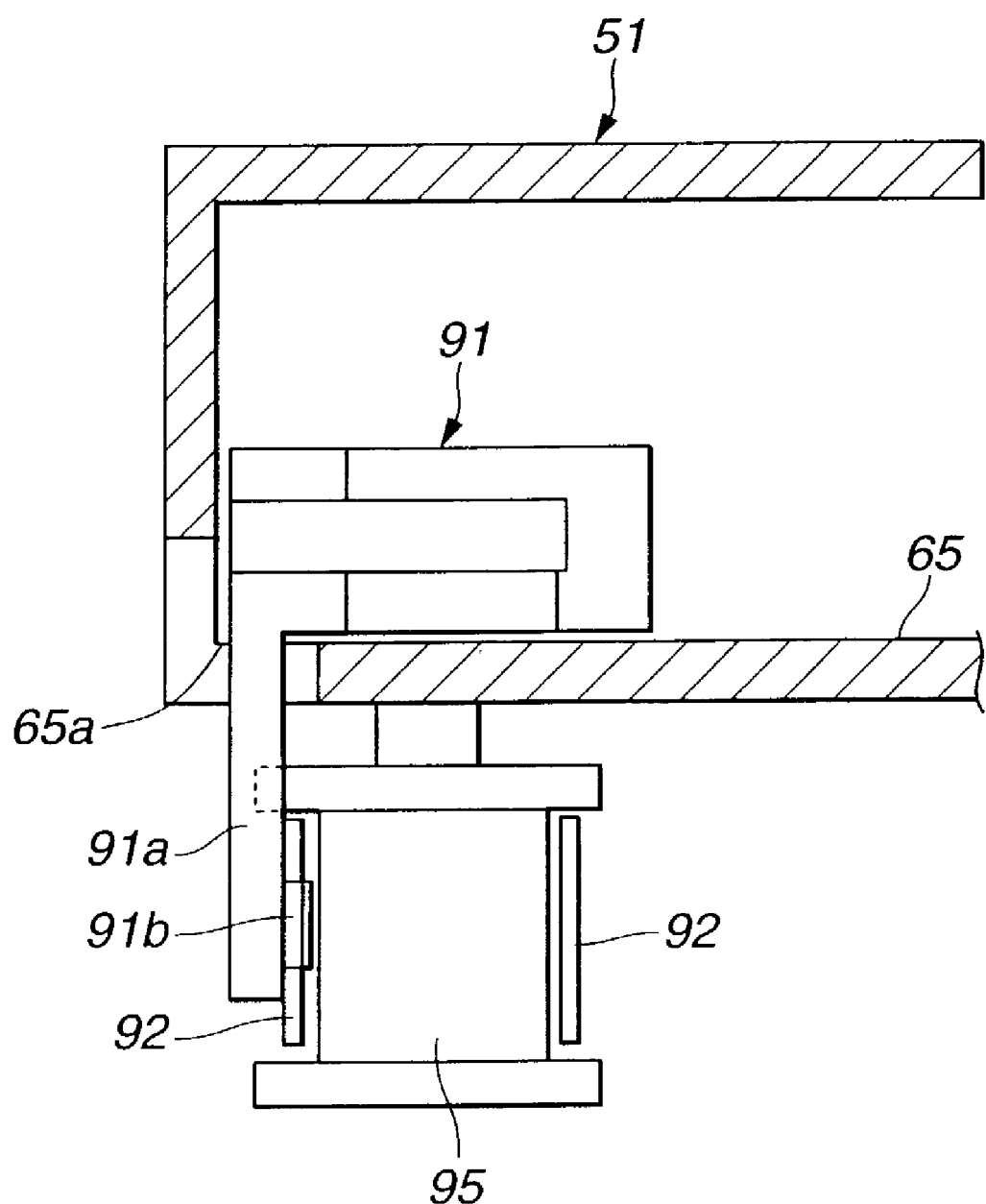
FIG. 24 is an A—A sectional view in FIG. 22.
Figure 25:
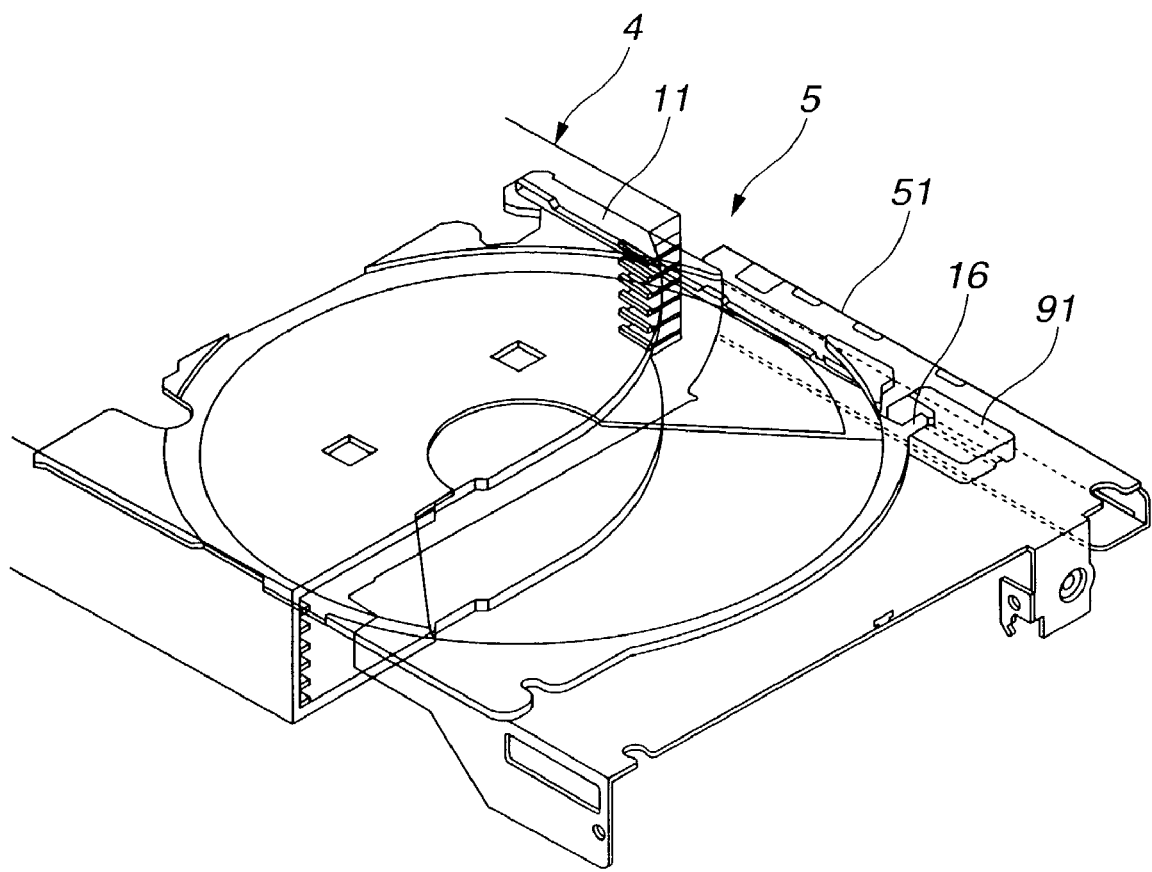
FIG. 25 is a perspective view when the tray is drawn into the elevator side.

FIG. 22 is a plan view of the loading mechanism. FIG. 23 is an exploded perspective view. FIG. 24 is an A–A' sectional view in FIG. 22. FIG. 25 is a perspective view showing a tray drawn in.

As shown in FIG. 22, the loading mechanism 7 comprises a hook engaging portion 91 engaged with the hook portion 16 of the tray 11, a belt 92 for moving the hook engaging portion 91 in the tray access direction, and a belt drive mechanism 93 for driving the belt 92. The hook engaging portion 91 is disposed on the upper side of the third tray support portion 65 of the upper block portion 51 of the elevator 5, whereas the belt 92 and the belt drive mechanism 93 are disposed on the lower side of the third tray support portion 65.

As shown in FIG. 23, the hook engaging portion 91 has a connecting portion 91a with the belt 92. The connecting portion 91a protrudes to the underside of the third tray support portion 65 through a guide hole 65a provided in the third tray support portion 65, and it is mounted to the belt 92 by a pin 91b.

The belt 92 is formed like a no-end shape or endless shape (refer hereinafter to the belt 92 as endless belt). The endless belt 92 is looped between a first pulley 94 and a second pulley 95, wherein at least one linear portion therebetween is arranged in parallel with the tray access direction. The hook engaging portion 91 is mounted to the one linear portion, and is moved in the tray access direction along the guide hole 65a by rotation of the endless belt 92. The endless belt 92 is formed with a plurality of recess holes 92a, . . . 92a at predetermined intervals in the running direction thereof.

The belt drive mechanism 93 comprises a sprocket 100 for driving the endless belt 92, a first gear 101 arranged coaxially with the sprocket 100, a second gear 102 meshed with the first gear 101, a third gear 103 meshed with the second gear 102, a fourth gear 104 arranged coaxially with the third gear 103, a fifth gear 105 meshed with the fourth gear 104, and a loading motor 106 for rotating the fifth gear 105.

The sprocket 100 is disposed at another linear portion of the endless belt 92. The sprocket 100 is provided on the periphery with protrusions 100a, . . . 100a engaged with the recess holes 92a, . . . 92a of the endless belt 92.

The first gear 101 is provided on the underside of the sprocket 100 through a spacer 107. The spacer 107 is provided with an arc-like recess 108.

An upper half portion of the second gear 102 is provided with a chipped-teeth portion 109, and a portion of the top face of the second gear 102 corresponding to the chipped-teeth tooth portion 109 is provided with an arc-like rib 110 which is opposite to the recess 108 of the spacer 107. The first gear 101 is meshed with the upper half portion of the second gear 102 having the chipped-teeth portion 109. The third gear 103 is meshed with both of the upper half and lower half portions of the second gear 102. A screw gear (helical gear) serves as fourth gear 104, and a worm gear serves as fifth gear 105.

As shown in FIG. 22, if the disk cartridge 4 is inserted in the cartridge housing 3 of the mechanical chassis from the direction of arrow A with the hook engaging portion 91 moved most forward toward the tray access of the elevator 5, the hook portion 16 of the tray 11 is automatically engaged with the hook engaging portion 91.

In this state, if the motor 106 is rotated in one direction, the sprocket 100 is rotated counterclockwise through the fifth gear 105 to the first gear 101 to rotate the endless belt 92 clockwise, drawing the tray 11 into the elevator 5 as shown in FIG. 25. When the tray 11 is drawn therein to a predetermined position, mesh of the second gear 102 and the first gear 101 is released to stop the sprocket 100 and the endless belt 92.

As shown in FIG. 23, the second gear 102 is provided on the top face with a sixth gear 111 for rotating the lower block portion 53 of the elevator 5 in synchronization with the loading mechanism 7.

The sixth gear 111 has a chipped-teeth portion 111a. The sixth gear 111 is meshed with a rack 112a of a rack member 112 mounted to the lower end of the second lower-block rotation operating unit 55 of the elevator 5. The rack member 112 is provided on one side with an inclined operation groove 63 in which the second shaft 64 on one side of the lower block portion 53 of the elevator 5 is inserted. The rack member 112 is mounted to a mounting portion 55a at a lower end of the second lower-block rotation operating unit 55 of the elevator 5.

Figure 27:
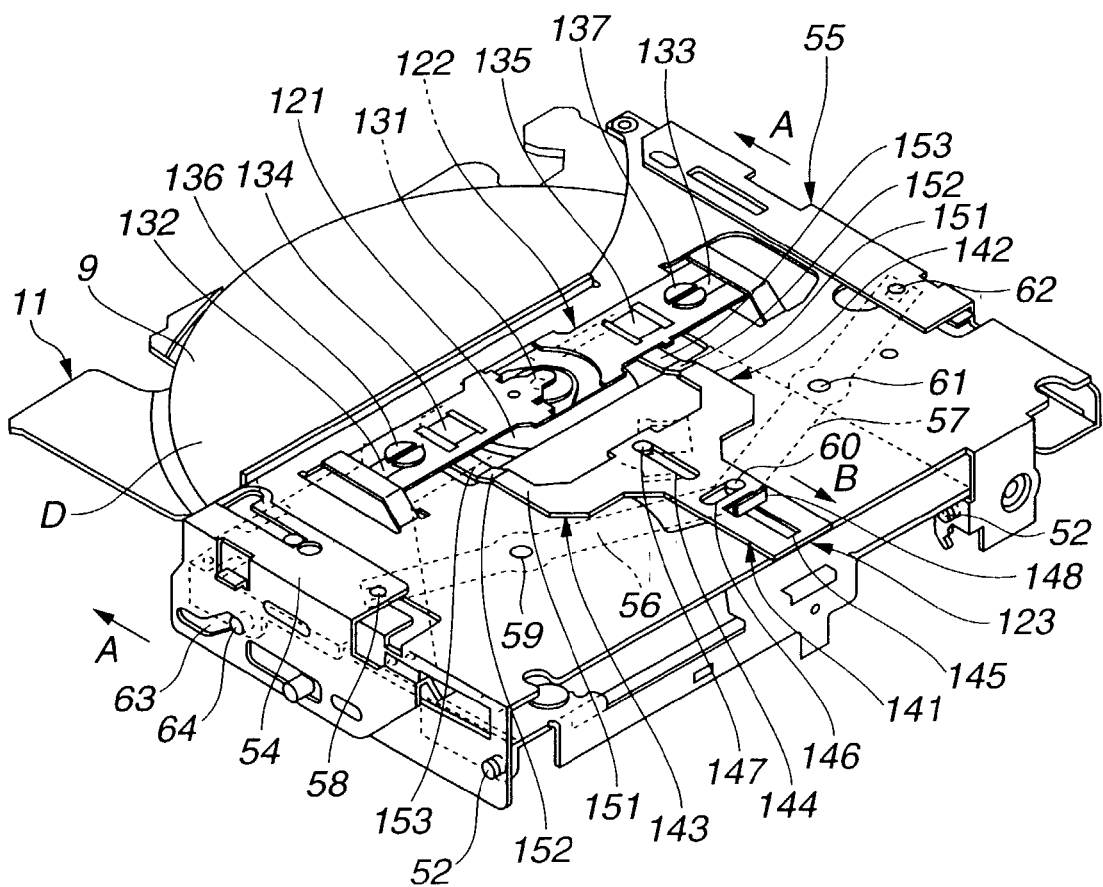
FIG. 27 is a perspective view of the disk chucking mechanism.

As described above, when the tray 11 is drawn in the elevator 5 to a predetermined position so as to release mesh of the second gear 102 and the first gear 101, the six gear 111 and the rack member 112 are meshed with each other to move the rack member 112 and the second lower-block rotation operating unit 55 leftward (direction of arrow A) in FIG. 23, pushing up the second shaft 64 to the upper end of the inclined operation groove 63. On the other hand, movement of the second lower-block rotation operating unit 55 causes the first lower-block rotation operating unit 54 to move in the same direction through the first and second link levers 56, 57, pushing up, as shown in FIG. 27, the second shaft 64 of another side face of the lower block portion 53 to the upper end of the inclined operation groove 63 in the same way as the second lower-block rotation operating unit 55, rotating the lower block portion 53 upward, thus disposing the disk D supported by the tray 11 on the disk table 68.

Moreover, when reversely rotating the loading motor 106 in the state where the lower block portion 53 is rotated upward, the rack member 112 and the second lower-block rotation operating unit 55 are moved in the direction opposite to that during tray drawing-in. In synchronization therewith, the first lower-block rotation operating unit 54 is moved in the same direction to rotate the lower block portion 53 downward, achieving the disk table 68 separated from the tray 11. Then, the second gear 102 and the first gear 101 are meshed with each other to rotate the sprocket 100 and the endless belt 92 in the direction opposite to that during tray drawing-in, pushing back the tray 11 into the disk cartridge 4 by the hook engaging portion 91.

(6) Description of Disk Chucking Mechanism

The disk chucking mechanism serves to press the disk onto the disk table to prevent slip of the disk thereon and rotate the disk table and the disk together, surely performing recording and/or reproducing of the disk.

Figure 26:
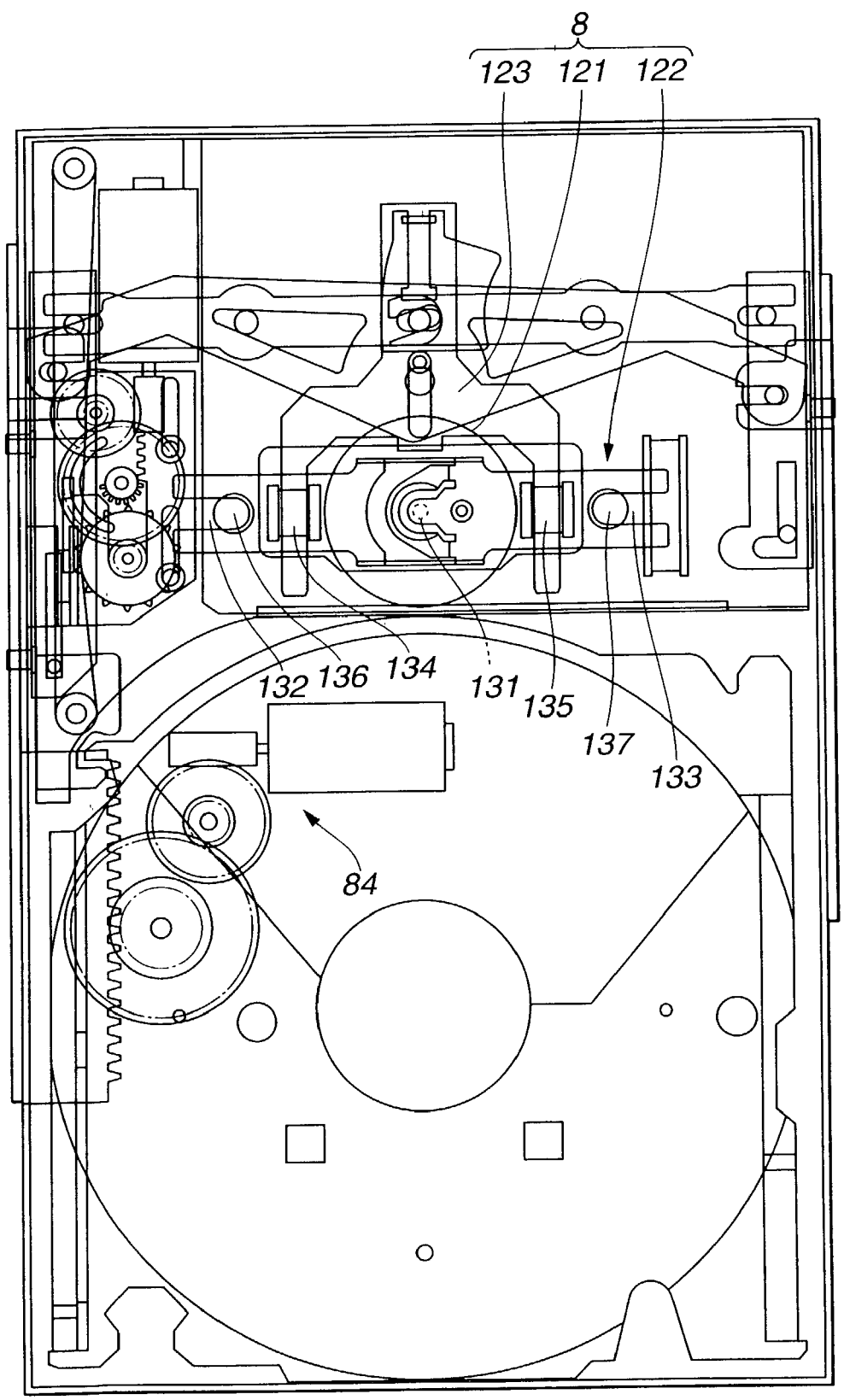
FIG. 26 is a plan view of the disk chucking mechanism.
Figure 28:
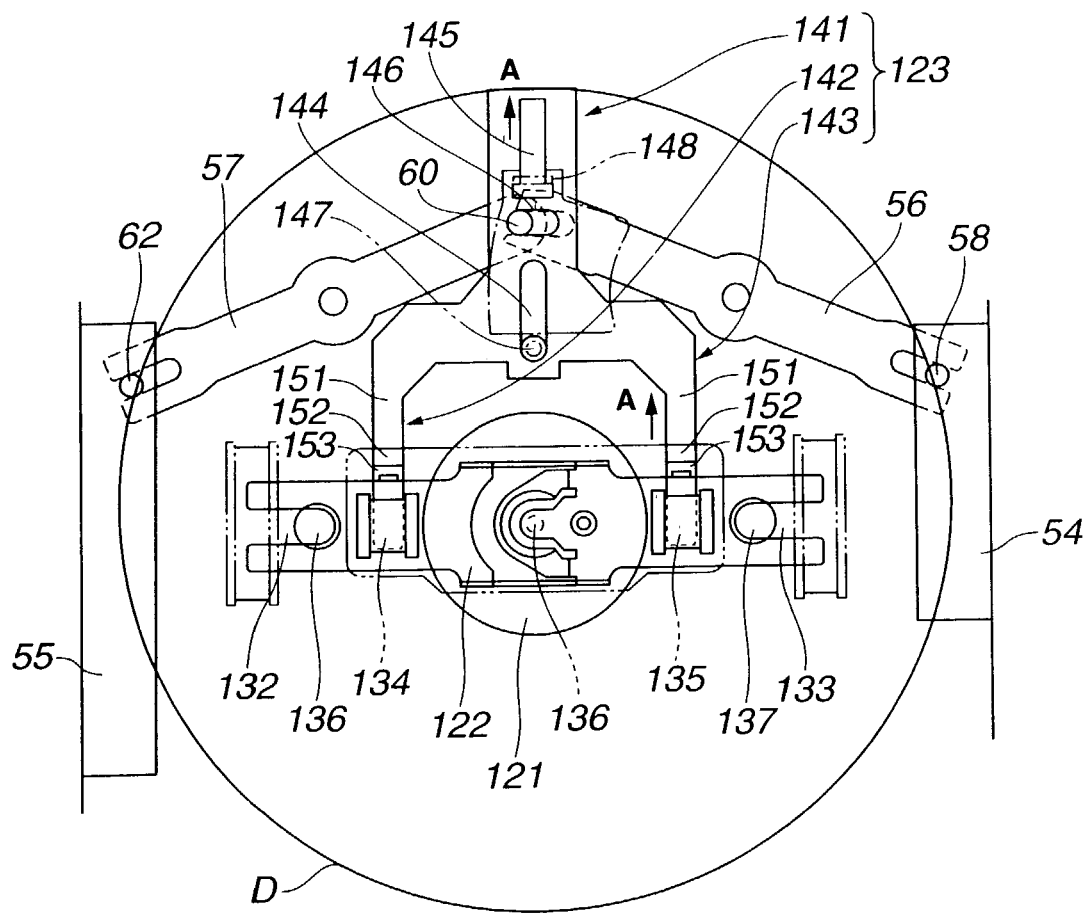
FIG. 28 is a plan view of the chucking state.
Figure 29:
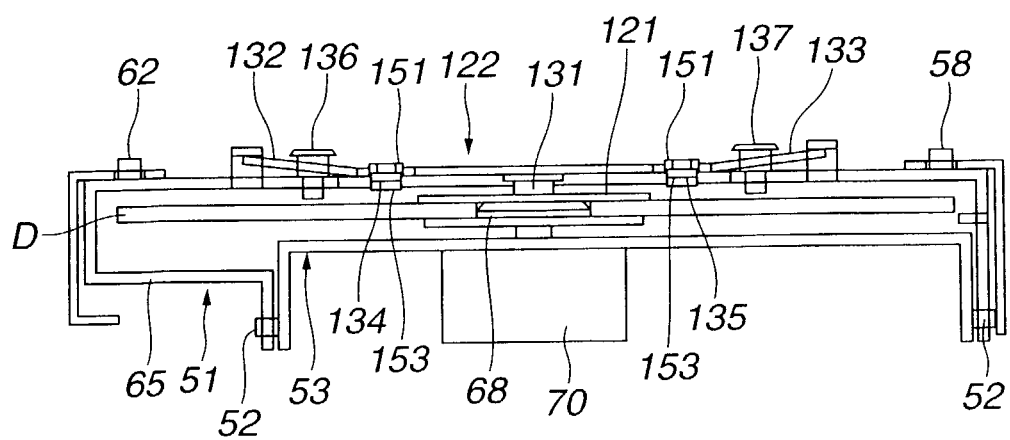
FIG. 29 is a front view of the chucking state.
Figure 30:
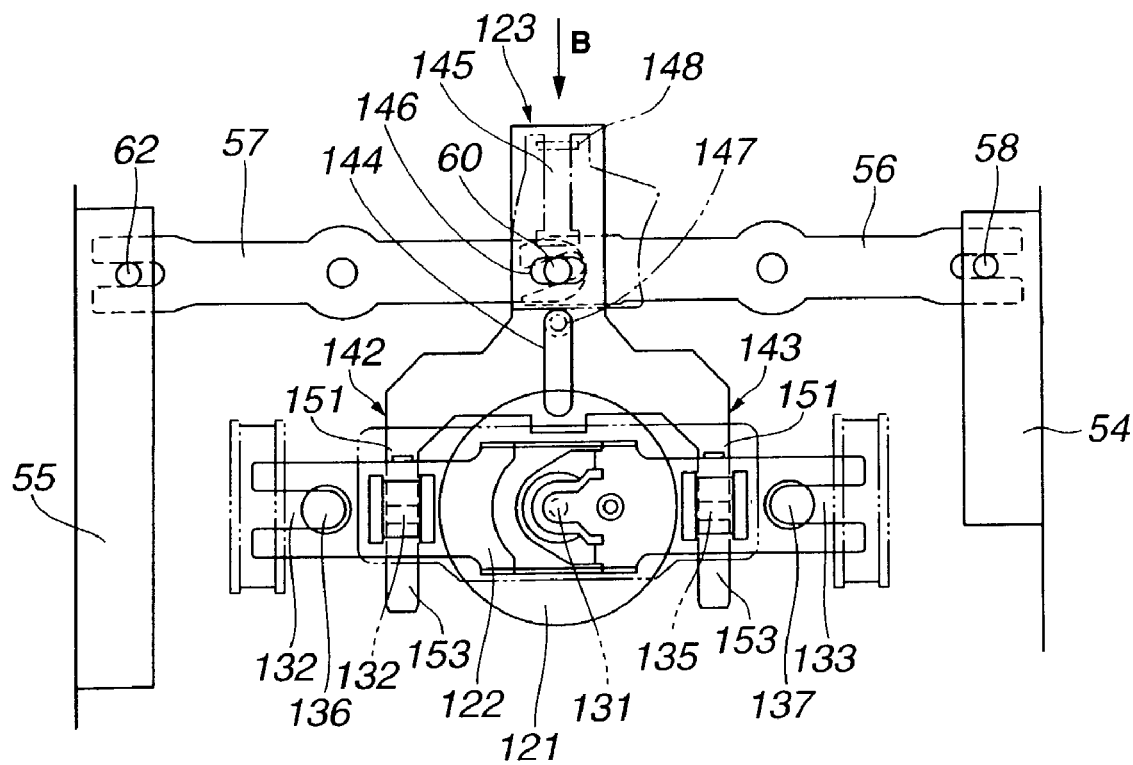
FIG. 30 is a plan view of the dechucking state.
Figure 31:
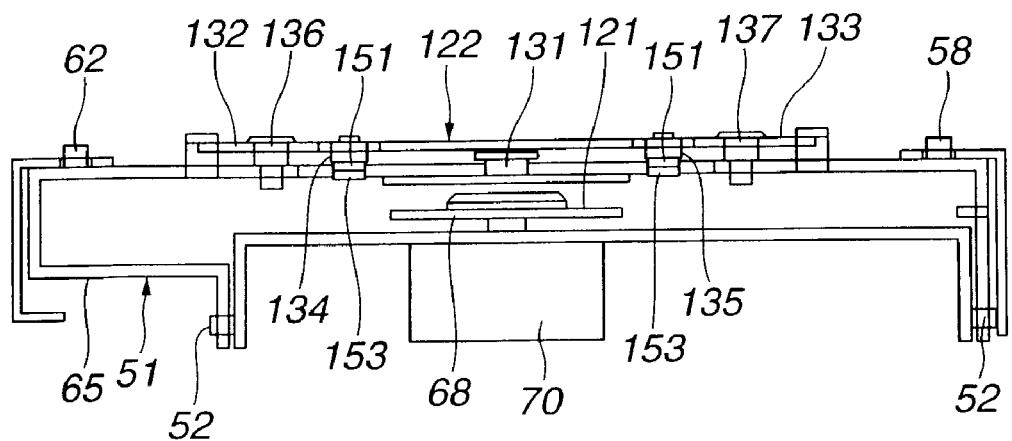
FIG. 31 is a front view of the dechucking state.
Figure 32:
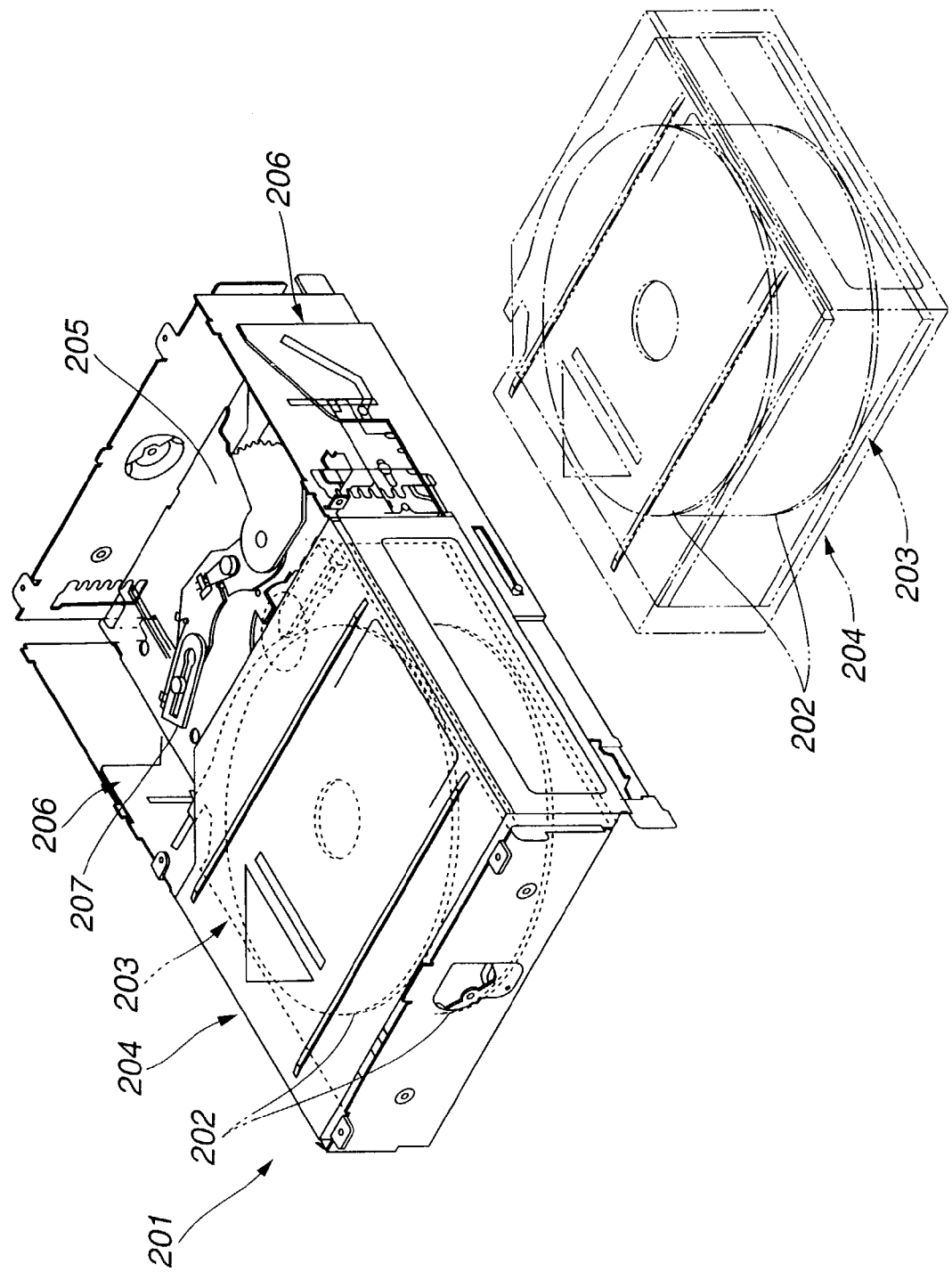
FIG. 32 is a perspective view of the conventional disk auto-changer.
Figure 33:
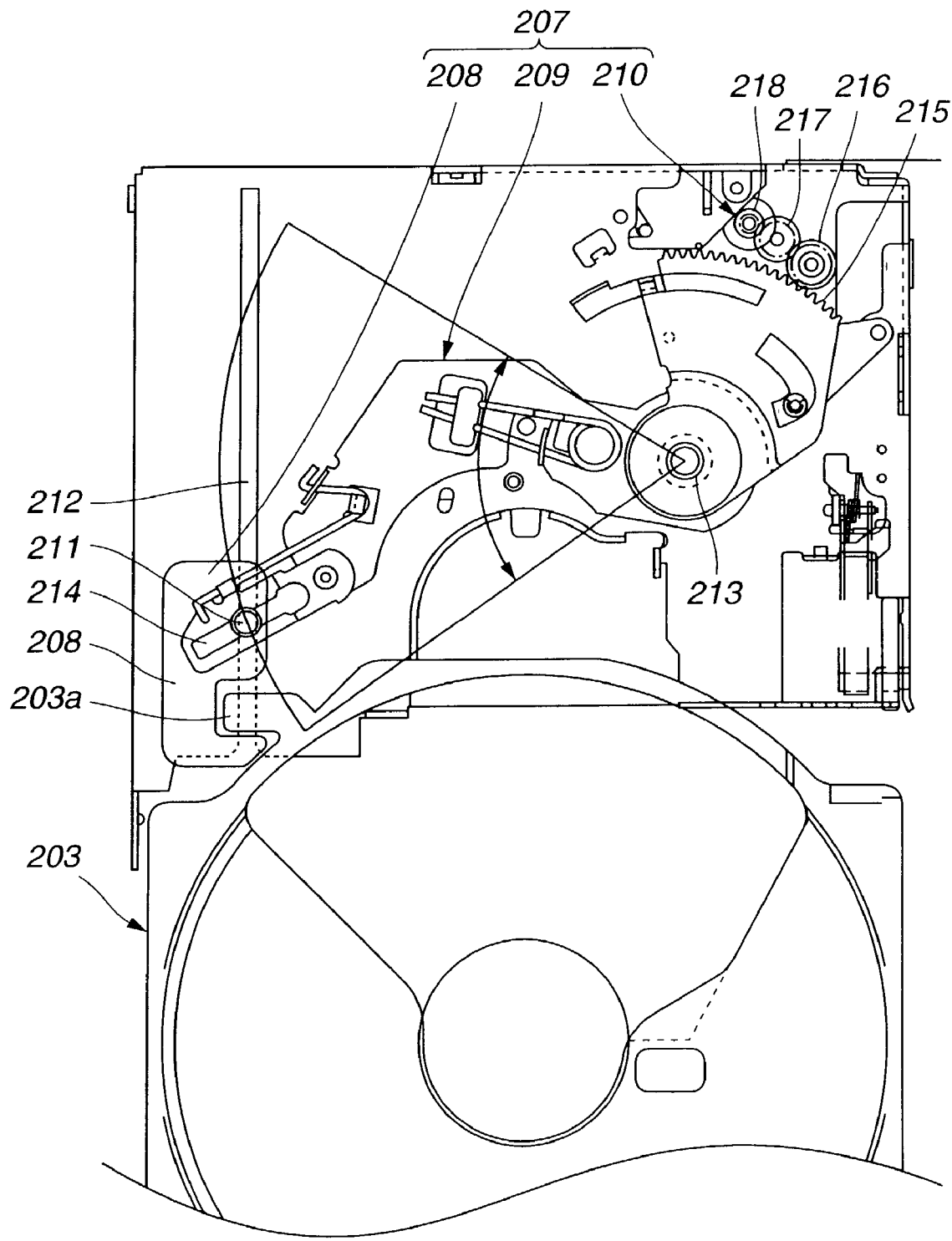
FIG. 33 is a plan view of the conventional loading mechanism.

FIG. 26 is a plan view for showing the disk chucking mechanism mounted to the top face of the elevator. FIG. 27 is a perspective view of the disk chucking mechanism. FIG. 28 is a plan view for showing the chucking state. FIG. 29 is a front view of the chucking state. FIG. 30 is a plan view for showing of the dechucking state. FIG. 31 is a front view of the dechucking state.

The disk chucking mechanism 8 comprises a chucking plate 121 for holding the disk, a chucking-plate support member 122 for supporting the chucking plate 121, and an operating portion 123 for press the disk against the chucking plate 121 through the chucking-plate support member 132.

The chucking plate 121 is formed like a circle having roughly the same diameter as that of the disk table 68, and is supported by the chucking-plate support member 122 with slight vertical motion of the center portion allowed by a shaft 131.

The chucking-plate support member 122 is formed like a narrow rectangle by a plate spring material, and has first and second slots 132, 133 formed at one and another ends in the length direction, and first and second protrusions 134, 135 formed inside the first and second slots 132, 133 in the cutting and standing way so called to protrude toward the underside.

The chucking-plate support member 122 is mounted on the top face of the upper block portion 51 of the elevator 5 by the first and second shafts 136, 137 inserted in the first and second slots 132, 133 so as to be movable in the longitudinal direction of the first and second slots 132,133.

As shown in FIG. 29, the chucking-plate support member 122 is bent downward, and undergoes a spring force in the direction to press the chucking plate 121 against the disk table 68.

As shown in FIG. 28, the operating portion 123 comprises a base 141 and first and second arms 142, 143 bifurcated from the tip of the base 141.

The base 141 is provided with first and second slide-guide slots 144, 145, and a connecting-pin receiving slot 146 arranged between the first and second slide-guide slots 144,145.

Using the first and second slide-guide slots 144, 145, the base 141 is mounted to the top face of the upper block portion 51 of the elevator 5 by the first and second slide guide members 147, 148 to be slidable within the range of the length of the first and second slide-guide slots 144, 145. The connecting pin 60 for the first link lever 56 and the second link lever 57 arranged on the top face of the upper block portion 51 is loosely fitted in the connecting-pin receiving slot 146.

The first and second arms 142, 143 each comprises a chucking-plate support-member pushing-up portion 151 which abuts on the underside of the first and second protrusions 134, 135 and pushes up the first and second protrusions 134, 135 and the chucking-plate support member 122 against a spring force to separate the chucking plate 121 from the disk D on the disk table 68, and a chucking-plate support-member descent allowing portion 153 continuously provided to the pushing-up portion 151 through a downward inclined face 152.

As shown in FIG. 28, with the operating portion 123 slid in the direction of arrow A, the chucking-plate support-member descent allowing portions 153 of the first and second arms 142, 143 are positioned on the underside of the first and second protrusions 134, 135 of the chucking-plate support member 122. And as shown in FIG. 29, the chucking-plate support member 122 deforms downward by its own spring force to move downward the chucking plate 121 to the disk table 68, chucking the disk D between the chucking plate 121 and the disk table 68 (at this time, the lower block portion 53 of the elevator 5 rotates upward in synchronization with operation of the operating portion 123 to move upward the disk table 68).

As shown in FIGS. 30–31, when sliding the operating portion 123 in the direction of arrow B, the chucking-plate support-member pushing-up portions 151, 151 of the first and second arms 142, 143 are positioned on the underside of the first and second protrusions 134, 135 of the chucking-plate support member 122. And the chucking-plate support member 122 is pushed up against its own spring force to separate the chucking plate 121 from the disk on the disk table 68 (at this time, the lower block portion 53 of the elevator 5 rotates downward in synchronization with operation of the operating portion 123 to move downward the disk table 68).

Synchronized operation of the operating portion 123 and the lower block portion 53 is performed through the first and second link levers 56, 57 provided on the underside of the upper block portion 51 of the elevator 5.

As shown in FIG. 27, when the tray 11 is loaded to a predetermined position of the elevator 5 by the loading mechanism, the second lower-block rotation operating unit 55 of the elevator 5 is moved in the direction of arrow A by the loading mechanism 7. (For the details, refer to "(2) Description of elevator").

When sliding the second lower-block rotation operating unit 55 in the direction of arrow A, the second link lever 57 having one end connected to the second lower-block rotation operating unit 55 by the shaft 62 is rotated counterclockwise about the fourth shaft 61, and the first link lever 56 is rotated clockwise about the second shaft 59. And the first lower-block rotation operating unit 54 connected to one end of the first link lever 56 through the first shaft 58 is moved in the direction of arrow A. Specifically, the second lower-block rotation operating unit 55 and the first lower-block rotation operating unit 54 are slid synchronously in the direction of arrow A to position the second shaft 64 of the lower block portion 53 on the upper end of the inclined operation groove 63 provided in the lower part of the first and second lower-block rotation operating units 54, 55, rotating the lower block portion 53 clockwise about the first shaft 52, thus moving upward the disk table 68.

As described above, when the second link lever 57 is rotated counterclockwise about the fourth shaft 61, the operating portion 123 is slid in the direction of arrow B through the connecting pin 60 of the first and second link levers 56, 57 and the connecting-pin receiving slot 146. The chucking-plate support member descent allowing portions 153, 153 of the first and second arms 142, 143 are positioned in the lower part of the first and second protrusions 134, 135 of the chucking-plate support member 122 to deform the chucking-plate support member 122 by its own spring force, pressing the disk D against the disk table 68 by the chucking plate 121, thus chucking the disk D.

During unloading of the tray, the first and second lower-block rotation operating units 54, 55 and the operating portion 123 are slid in the direction opposite to that during loading, which pushes up the chucking-plate support member 122 to move upward the chucking plate 121 to the dechucking position, and rotate the lower block portion 53 downward to separate the disk table 68 from the disk and the tray.

(7) Description of Disk Changer in its Entirety

When the disks D are disposed on the trays 11, . . . 11 of the disk cartridge 4 to load the disk cartridge 4 in the cartridge housing 3, the hook portions 16 of the trays 11, . . . 11 and the hook engaging portions 91 of the loading mechanism 7 provided to the elevator 5 become in the state engageable with each other.

Then, the elevator 5 is moved upward by the up-and-down movement control mechanism 6 from the standby position to the position corresponding to the tray 11 having a desired disk dispose thereon. Then, the loading mechanism 7 draws the tray 11 having the desired disk disposed thereon in the elevator 5 from the disk cartridge 4.

When the tray 11 is drawn in the elevator 5 to a predetermined position, the lower block portion 53 is rotated upward by the loading mechanism 7 to move the disk table 68 mounted to the lower block portion 53 upward, disposing the disk D of the tray 11 on the disk table 68. In synchronization with rotating operation of the lower block portion 53, the disk chucking mechanism 8 is actuated to move the chucking plate 121 downward, chucking the disk D on the disk table 68 with the tray 11 separated from the underside of the disk D, thus performing recording and/or reproducing of the disk.

When actuating the loading mechanism 7 again after completion of recording and/or reproducing, the lower block portion 53 of the elevator 5 is rotated downward by the loading mechanism 7 to separate from the disk D and the tray 11. Moreover, in synchronization with rotation of the lower block portion 53, the disk chucking mechanism 8 is actuated to move the chucking plate 121 upward, thus dechuck the disk.

Then, through continuous operation of the loading mechanism 7, the tray 11 is returned to the disk cartridge 4 from the elevator 5. When the tray 11 is completely returned to the disk cartridge 4, the up-and-down movement control mechanism 6 is actuated again to return the elevator 5 to the standby position.

(8) Description of Another Embodiment of Loading Mechanism

In the above embodiment, the endless belt 93 is looped between the first pulley 101 and the second pulley 102, wherein the tray engaging portion 91 is mounted to one linear portion between the first and second pulleys 101, 102, and the sprocket 94 is brought into contact with another linear portion. Alternatively, in place of the sprocket 94, either the first pulley 101 or the second pulley 102 may be used as a drive pulley rotated by the motor 100 through a gear train, etc. In this case, a sprocket may be used for the drive pulley. Moreover, a belt with end may be used in place of the endless belt 93.

INDSTRIAL APPLICABILITY

The disk recording and/or reproducing apparatus and loading mechanism of the present invention can widely be used as a disk auto-changer for recording and/or reproducing of optical disks, magneto-optical disks, etc.

The invention claimed is:

1. A disk recording and/or reproducing apparatus comprising:
   a disk cartridge including a plurality of trays for holding disks;
   a disk recording and/or reproducing portion disposed opposite to an opening of the disk cartridge; and
   a loading mechanism for carrying the trays out of the disk cartridge to the disk recording and/or reproducing portion and for carrying the trays from the disk recording and/or reproducing portion into the disk cartridge, the loading mechanism including,
   a tray engaging portion configured to engage with a first portion of each tray,
   a guide rail positioned substantially in-line with the tray engaging portion with respect to a tray movement direction, said guide rail configured to engage with a second portion of the tray,
   a belt for moving the tray engaging portion, and a belt drive mechanism for driving the belt.

2. The disk recording and/or reproducing apparatus as specified in claim 1, wherein the belt is an endless belt.

3. The disk recording and/or reproducing apparatus as specified in claim 2, wherein the endless belt is looped between pulleys, and the tray engaging portion is mounted to the endless belt in such a way as to be movable in the tray movement direction.

4. The disk recording and/or reproducing apparatus as specified in claim 3, wherein the belt drive mechanism includes:
   a sprocket,
   a gear set, and
   a loading motor,
   wherein the sprocket comes in contact with a linear portion of the endless belt between the pulleys to move the endless belt, and at least the linear portion of the endless belt with which the sprocket comes in contact includes a hole engaged with a protrusion arranged on a circumferential surface of the sprocket.

5. A loading mechanism comprising:
   a belt configured to drive a tray engaging portion, said tray engaging portion configured to engage with a first portion of a tray of a disk cartridge, said belt configured to perform carrying-out and carrying-in of the tray; and
   a guide rail configured to engage with a second portion of the tray, said guide rail formed in-line with the tray engaging portion with respect to a tray movement direction.

* * * * *